(12) United States Patent
Ogawa

(10) Patent No.: US 9,018,873 B2
(45) Date of Patent: Apr. 28, 2015

(54) PWM SIGNAL OUTPUT CIRCUIT

(75) Inventor: Takashi Ogawa, Gifu-ken (JP)

(73) Assignee: Semiconductor Components Industries, LLC, Pheonix, AZ (US)

( * ) Notice: Subject to any disclaimer, the term of this patent is extended or adjusted under 35 U.S.C. 154(b) by 168 days.

(21) Appl. No.: 13/617,484

(22) Filed: Sep. 14, 2012

(65) Prior Publication Data

US 2013/0113401 A1    May 9, 2013

(30) Foreign Application Priority Data

Sep. 15, 2011    (JP) ................................. 2011-202182

(51) Int. Cl.
| | |
|---|---|
| H02P 1/04 | (2006.01) |
| H02P 6/16 | (2006.01) |
| H02P 6/14 | (2006.01) |
| H02P 6/00 | (2006.01) |

(52) U.S. Cl.
CPC ................ H02P 6/142 (2013.01); H02P 6/008 (2013.01); H02P 6/16 (2013.01)

(58) Field of Classification Search
CPC ....................................... H02P 6/142
USPC ................... 318/400.19, 400.01, 503, 400.04
See application file for complete search history.

(56) References Cited

U.S. PATENT DOCUMENTS

2010/0308760 A1* 12/2010 Nakamura ............... 318/400.11
2011/0181214 A1*  7/2011 Nakahata et al. ........ 318/400.04
2011/0260669 A1* 10/2011 Nakahata et al. ............. 318/503

FOREIGN PATENT DOCUMENTS

JP         2002186275 A    6/2002

* cited by examiner

*Primary Examiner* — Bentsu Ro
*Assistant Examiner* — Zemenay Truneh
(74) *Attorney, Agent, or Firm* — Robert F. Hightower

(57) ABSTRACT

A PWM-signal-output circuit includes a detecting unit to detect time periods during which a speed signal with logic level changing alternately and having a period corresponding to a motor-rotation speed is at one and the other logic levels; a generating unit configured to, when the logic level of the speed signal changes, generate a signal to increase and thereafter decrease a current flowing through a motor coil within a first time period detected by the detecting unit, in a second time period occurring after the first time period; and a second generating unit configured to, when the first time period has elapsed after a change in the logic level of the speed signal but before a subsequent change in the logic level thereof in the second time period, generate the signal from when the first time period has elapsed until when the logic level thereof changes.

9 Claims, 17 Drawing Sheets

PWM SIGNAL OUTPUT CIRCUIT

CROSS-REFERENCE TO RELATED APPLICATION

This application claims the benefit of priority to Japanese Patent Application No. 2011-202182, filed Sep. 15, 2011, of which full contents are incorporated herein by reference.

BACKGROUND OF THE INVENTION

1. Field of the Invention

The present invention relates to a PWM signal output circuit.

2. Description of the Related Art

With respect to a motor drive circuit configured to change a current of a motor coil in a gentle manner, the motor drive circuit configured to perform soft switching is known (see, e.g., Japanese Laid-Open Patent Publication No. 2002-186275).

The motor drive circuit configured to perform the soft switching includes a motor drive circuit configured to detect each of a time period during which an FG (Frequency Generator) signal is high and a time period during which the FG signal is low, that is, almost half of the period of the FG signal, and perform the soft switching in the detected time period. Such a motor drive circuit is configured to drive the motor so that a current flowing through the motor coil increases and thereafter decreases in the detected time period, every time a logic level of the FG signal changes.

Incidentally, even if the rotation speed of the motor is constant, since generally the period of the FG signal varies, the time period during which the motor drive circuit increases and thereafter decreases a current flowing through the motor coil might differ from the time period corresponding to half the period of the actual FG signal. Thus, even if the motor is driven to cause a current flowing through the motor coil to increase and thereafter decrease in the detected time period so that a current flowing through the motor coil is sufficiently small at the time of phase switching, as a result, a current flowing through the motor coil is not small at the time of phase switching and the motor may not rotate in a stable manner.

SUMMARY OF THE INVENTION

A PWM signal output circuit according to an aspect of the present invention that is configured to output a PWM signal to a drive circuit configured to drive a motor based on the PWM signal, the PWM signal output circuit includes: a detecting unit configured to detect a time period during which a speed signal is at one logic level and a time period during which the speed signal is at an other logic level, based on the speed signal whose logic level changes in an alternate manner, the speed signal having a period corresponding to a rotation speed of the motor; a first generating unit configured to, when the logic level of the speed signal changes, generate the PWM signal to increase and thereafter decrease a current flowing through a motor coil of the motor within a time period corresponding to a first time period detected by the detecting unit, in a second time period during which the speed signal is at the one logic level or the other logic level, the second time period occurring after the first time period; and a second generating unit configured to, when the time period corresponding to the first time period has elapsed after a change in the logic level of the speed signal but before a subsequent change in the logic level of the speed signal in the second time period, generate the PWM signal with a predetermined duty cycle from when the time period corresponding to the first time period has elapsed until when the logic level of the speed signal changes.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2 is a diagram illustrating a configuration of a drive signal output circuit 24a;

DETAILED DESCRIPTION OF THE INVENTION

At least the following details will become apparent from descriptions of this specification and of the accompanying drawings.

Figure 1:
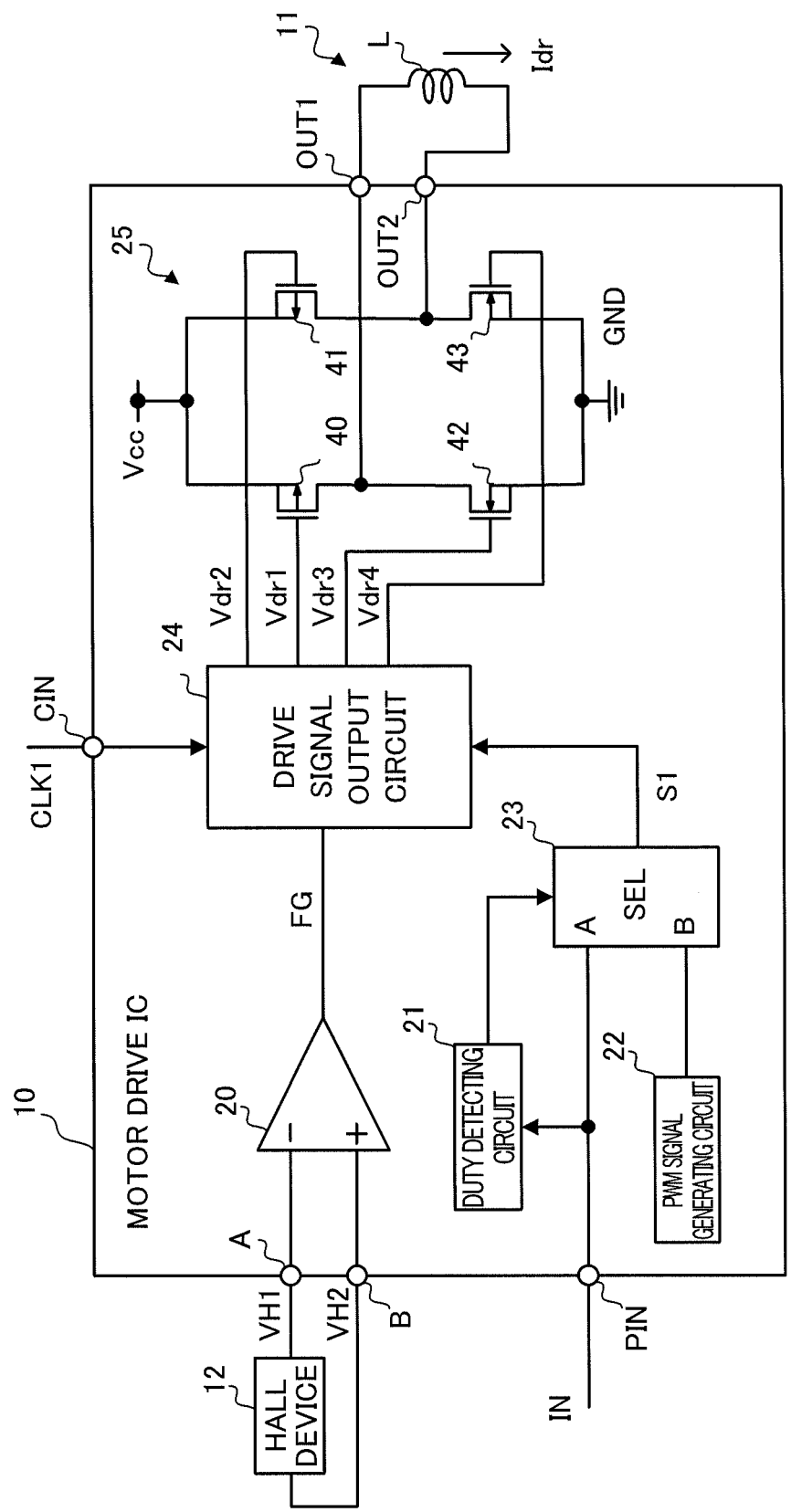
FIG. 1 is a diagram illustrating a configuration of a motor drive IC 10 according to an embodiment of the present invention.

FIG. 1 depicts a configuration of a motor drive IC 10 according to an embodiment of the present invention. The motor drive IC 10 is a circuit configured to drive a motor 11 so that the rotation speed of the motor 11 reaches the rotation speed according to the duty cycle of a PWM (Pulse Width Modulation) signal IN outputted from a microcomputer (not shown).

The motor drive IC 10 includes a comparator 20, a duty detecting circuit 21, a PWM signal generating circuit 22, a selector (SEL) 23, a drive signal output circuit 24, an H-bridge circuit 25, and terminals A, B, PIN, CIN, OUT1, and OUT2.

The motor 11 is a single-phase fan motor configured to rotate a cooling fan, for example.

A Hall device 12 is configured to output, to the terminals A and B, Hall signals VH1 and VH2 acquired according to the rotational position of a rotor (not shown) in the motor 11, respectively.

The comparator 20 is configured to compare levels of the Hall signals VH1 and VH2 and generate an FG (Frequency Generator) signal with such a period as to change according to the rotation speed of the motor 11. The FG signal (speed signal) goes low (hereinafter, L level) when the level of the Hall signal VH1 becomes higher than the level of the Hall signal VH2, and goes high (hereinafter, H level) when the level of the Hall signal VH1 becomes lower than the level of the Hall signal VH2.

The duty detecting circuit 21 is configured to detect whether the duty cycle of H level (hereinafter referred to simply as duty cycle) of the PWM signal IN inputted from the microcomputer (not shown) via the terminal PIN is 100%. Specifically, the duty detecting circuit 21 detects that the duty cycle of the PWM signal IN is 100% when not detecting a rising edge of the PWM signal IN for a predetermined time period.

The PWM signal generating circuit 22 is configured to generate the PWM signal with the predetermined period whose duty cycle is 99%, for example.

The selector 23 is configured to output the signal inputted to a B input when it is detected that the duty cycle of the PWM signal IN is 100%, and output the PWM signal IN inputted to an A input when it is detected that the duty cycle of the PWM signal IN is not 100%.

Therefore, a PWM signal S1 whose duty cycle is equal to or smaller than 99% is constantly outputted from the selector 23. The circuit such as the selector 23 is a circuit configured to prevent the drive signal output circuit 24 from malfunctioning due to the PWM signal with 100% duty cycle.

The drive signal output circuit 24 is configured to output drive signals Vdr1 to Vdr4 for controlling the H-bridge circuit 25, based on a clock signal CLK1 with the predetermined period inputted via the terminal CIN, the FG signal, and the PWM signal S1.

The H-bridge circuit 25 (drive circuit) includes PMOS transistors 40 and 41 and NMOS transistors 42 and 43. The connection point between the PMOS transistor 40 and the NMOS transistor 42 is connected to the terminal OUT1, and the connection point between the PMOS transistor 41 and the NMOS transistor 43 is connected to the terminal OUT2. When the transistors in the H-bridge circuit 25 are turned on/off, the drive current Idr flowing through a motor coil L of the motor 11 flows from the terminal OUT1 to the terminal OUT2 or from the terminal OUT2 to the terminal OUT1.

Regarding Drive Signal Output Circuit 24a

First Embodiment of the Present Invention

Figure 2:
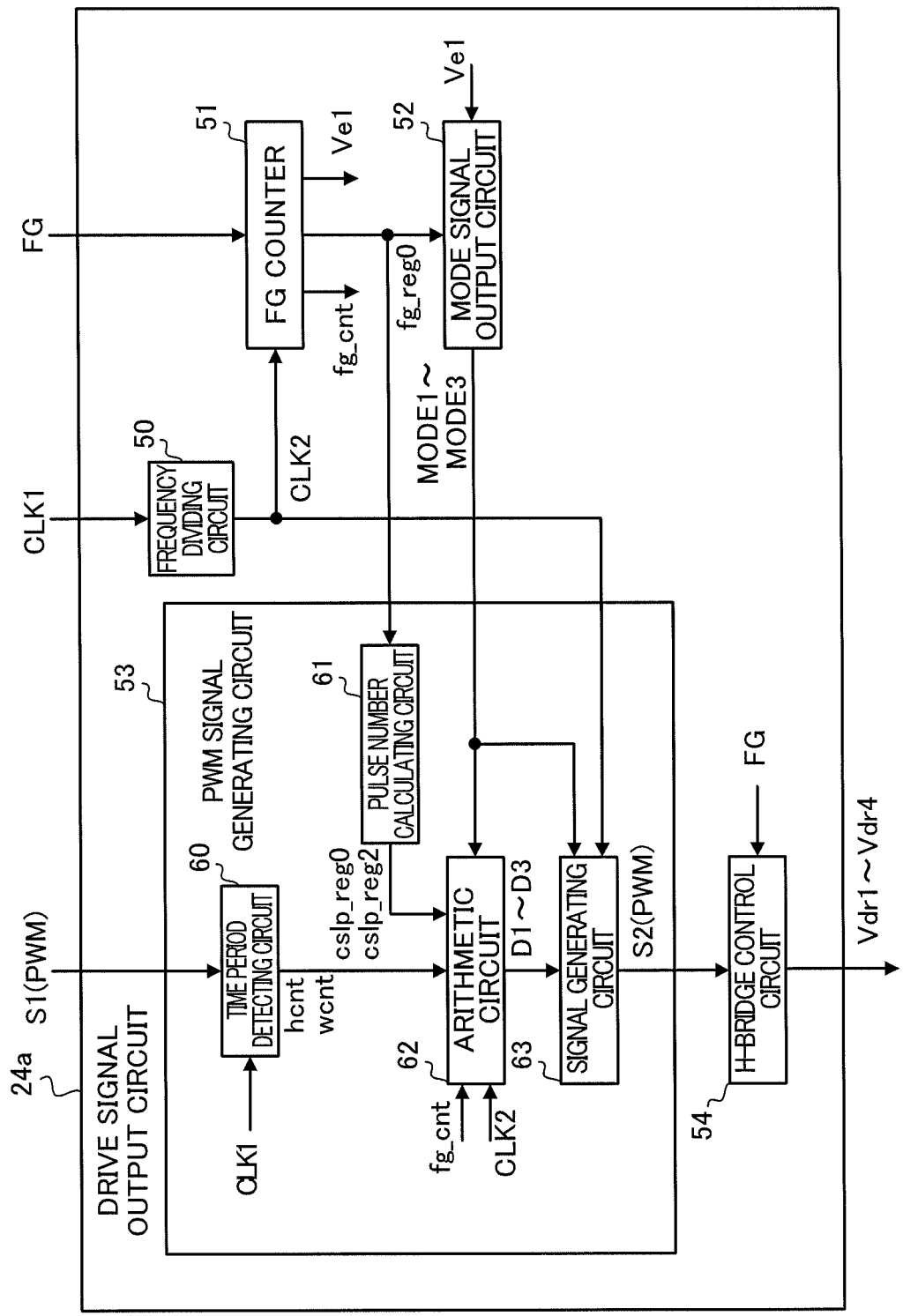

FIG. 2 depicts a configuration of the drive signal output circuit 24 according to a first embodiment of the present invention.

A drive signal output circuit 24a (PWM signal output circuit) is a circuit configured to generate the drive signals Vdr1 to Vdr4 to increase and thereafter decrease the drive current Idr during a time period from a change in the logic level of the FG signal to the subsequent change in the logic level of the FG signal. The drive signal output circuit 24a includes a frequency dividing circuit 50, an FG counter 51, a mode signal output circuit 52, a PWM signal generating circuit 53, and an H-bridge control circuit 54.

The frequency dividing circuit 50 is configured to generate a clock signal CLK2 obtained by frequency-dividing the clock signal CLK1 by 128, for example.

The FG counter 51 (detecting unit) is configured to detect a time period TA during which the FG signal is high and a time period TA during which the FG signal is low, namely, a time period that is almost equal to half the period of the FG signal.

The mode signal output circuit 52 is configured to divide the time period TA detected by the FG counter 51 into three time periods T1 to T3, and outputs mode signals MODE1 to MODE3 indicative of the time periods, respectively. The time period T1 is a time period during which the drive current Idr is increased in a stepwise manner, the time period T2 is a time period during which the drive current Idr is maintained constant, and the time period T3 is a time period during which the drive current Idr is decreased in a stepwise manner.

The PWM signal generating circuit 53 (first and second generating units) is configured to generate a PWM signal S2 with the predetermined period whose duty cycle is in accordance with that of that of the PWM signal S1 inputted thereto. Specifically, the PWM signal generating circuit 53 generates the PWM signal S2 whose duty cycle increases in a stepwise manner in the time period T1, is equal to the duty cycle of the PWM signal S1 in the time period T2, and decreases in a stepwise manner in the time period T3. That is, the PWM signal generating circuit 53 outputs a PWM signal S2 to cause the drive current Idr to increase and thereafter decrease in the time period TA. When the time period TA has elapsed, the PWM signal generating circuit 53 outputs the PWM signal S2 with the duty cycle of 0%, for example.

The H-bridge control circuit 54 is configured to generate the drive signals Vdr1 to Vdr4 based on the PWM signal S2 and the FG signal, and control the H-bridge circuit 25.

<<Details of FG Counter 51>>

Figure 3:
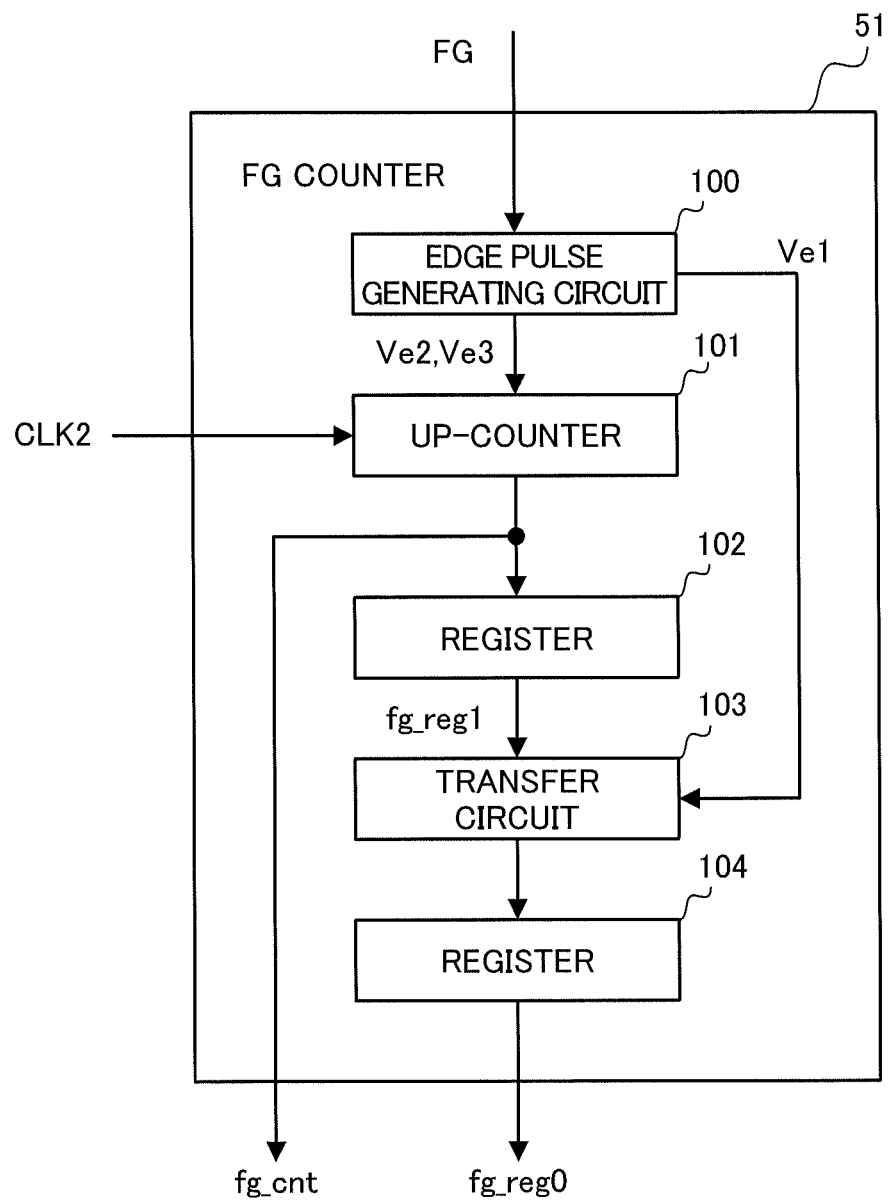
FIG. 3 is a diagram illustrating one example of an FG counter 51.

The FG counter 511 includes an edge pulse generating circuit 100, an up-counter 101, registers 102 and 104, and a transfer circuit 103, as depicted in FIG. 3, for example.

The edge pulse generating circuit 100 is configured to detect the rising edge and the falling edge of the FG signal, and output an edge pulse Ve1. Further, the edge pulse generating circuit 100 is configured to generate an edge pulse Ve2 obtained by delaying the edge pulse Ve1 and an edge pulse Ve3 obtained by delaying the edge pulse Ve2. A design is made such that a delay time of the edge pulses Ve2 and Ve3 is sufficiently shorter than the period of the clock signal CLK2.

The up-counter 101 is configured to count up based on the clock signal CLK2, and store a count value fg_cnt in the register 102 when the edge pulse Ve2 is inputted thereto. Further, the count value fg_cnt of the up-counter 101 is reset when the edge pulse Ve3 is inputted thereto.

The register 102 is configured to store a count value fg_reg1 of the up-counter 101 at the time when the edge pulse Ve2 is inputted to the up-counter 101.

When the edge pulse Ve1 is inputted to the transfer circuit 103, the transfer circuit 103 acquires the count value fg_reg1 stored in the register 102, to be stored in the register 104.

The register 104 is configured to store the count value transferred from the register 102 as a count value fg_reg0.

Figure 4:
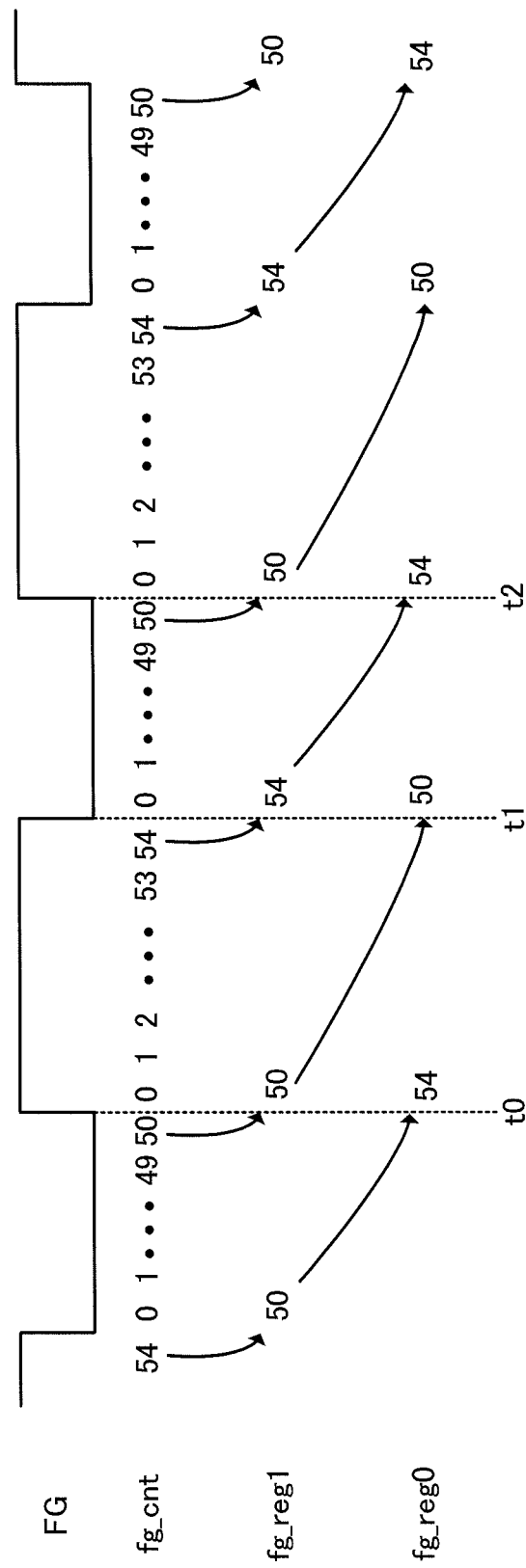
FIG. 4 is a diagram for describing an operation of an FG counter 51.

FIG. 4 is a diagram for describing an operation of the FG counter 51. It is assumed here, for example, that in a time period from time t0 to time t1, the count value fg_cnt of the up-counter 101 changes up to "54". It is assumed that the count value fg_reg1 to be stored in the register 102 reaches "50" at time to.

When the FG signal goes low at time t1, "50", which is the count value fg_reg1, is transferred and the count value fg_reg0 of the register 104 results in "50". The count value fg_reg1 of the register 102 is updated to "54" and the count value fg_cnt of the up-counter 101 is reset. That is, if the FG signal goes low at time t1, the count value fg_reg0 ("50") indicative of a time period during which the FG signal is low is outputted before the FG signal goes low at time t1.

Similarly, if the FG signal goes high at time t2, the count value fg_reg0 ("54") indicative of a time period (time t0 to t1) during which the FG signal is high is outputted before the FG signal goes high at time t2.

<<Details of Mode Signal Output Circuit 52>>

Figure 5:
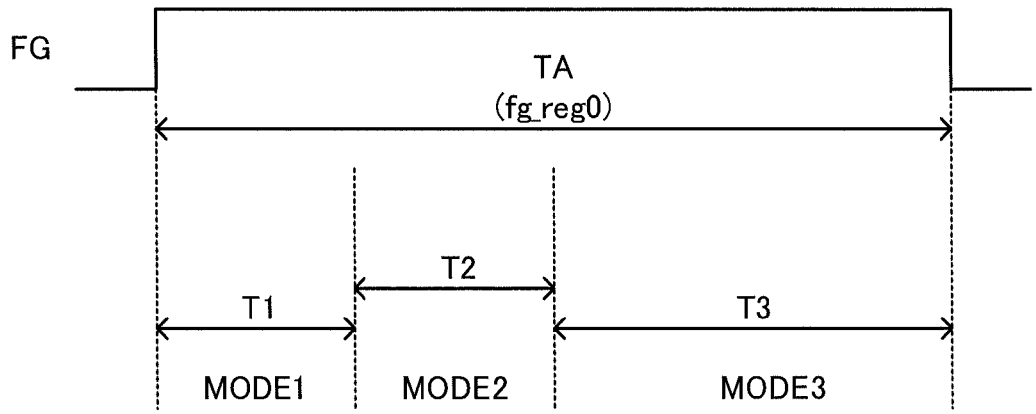
FIG. 5 is a diagram illustrating a relationship between a time period TA and time periods T1 to T3.

The mode signal output circuit 52 is configured to divide the time period TA into three time periods T1 to T3 and output the mode signals MODE1 to MODE3 indicative of the time periods T1 to T3, respectively, as depicted in FIG. 5, for example.

Figure 6:
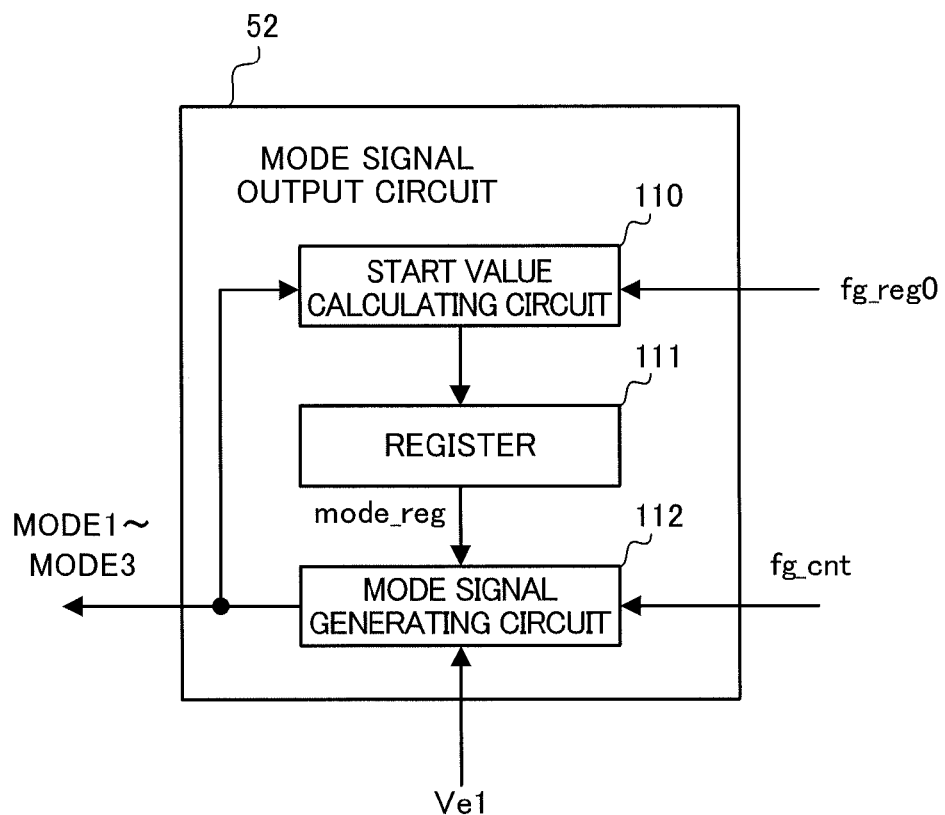
FIG. 6 is a diagram illustrating one example of a mode signal output circuit 52.

The mode signal output circuit 52 includes a start value calculating circuit 110, a register 111, and a mode signal generating circuit 112, as depicted in FIG. 6.

The start value calculating circuit 110 is configured to calculate a count value at which each of the time period T2 and the time period T3 is started, from the count value fg_reg0 indicative of the time period TA. Specifically, when the time period TA is divided such that the ratio of the time period T1, the time period T2, and the time period T3 becomes 1:1:2, for example, a count value CNT1 indicative of the start of the time period T2 results in (¼)×fg_reg0, and a count value CNT2 indicative of the start of the time period T3 results in (½)×fg_reg0. Therefore, the start value calculating circuit 110 calculates the count value CNT2 by shifting the count value fg_reg0 to the right by one bit, and calculates the count value CNT1 by shifting the count value fg_reg0 to the right by two bits, for example.

Further, the start value calculating circuit 110 stores the count value CNT1 indicative of the start of the time period T2 in the register 111 when the mode signal MODE1 is outputted, that is, during the time period T1. Furthermore, the start value calculating circuit 110 stores the count value CNT2 in the register 111 when the mode signal MODE2 is outputted, and stores the count value fg_reg in the register 111 when the mode signal MODE3 is outputted. A count value mode_reg of the register 111 is updated every time the count value is stored.

The mode signal generating circuit 112 is configured to compare the count value fg_cnt of the FG signal and the count value mode_reg, and output the mode signal in accordance with a result of such comparison. Further, the mode signal generating circuit 112 is configured to generate the mode signal MODE1 when the edge signal Ve1 is inputted thereto, that is, when the count value fg_cnt reaches zero. Then, when the count value fg_cnt is incremented to reach the count value CNT1, the mode signal generating circuit 112 generates the mode signal MODE2. Furthermore, when the count value fg_cnt is incremented to reach the count value CNT2, the mode signal generating circuit 112 generates the mode signal MODE3.

Figure 7:
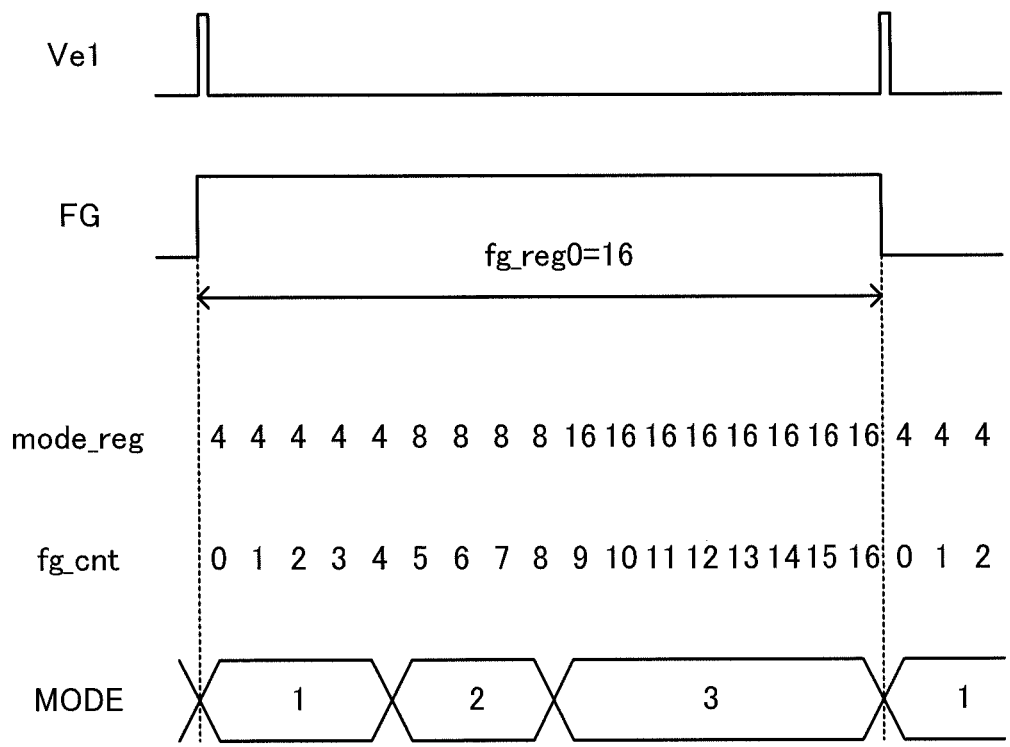
FIG. 7 is a diagram for describing an operation of a mode signal output circuit 52.

FIG. 7 is a diagram for describing an operation of the mode signal output circuit 52. A description will be given assuming that the count value fg_reg is "16", for example. Thus, the count value CNT1 at which the time period T2 starts results in "4" ((¼)×fg_reg0), and the count value CNT2 at which the time period T3 starts results in "8" ((½)×fg_reg0).

Firstly, when the edge pulse Ve1 is outputted, the mode signal MODE1 is generated and the count value mode_reg is set at "4". Therefore, the mode signal MODE1 indicative of the time period T1 is outputted until the count value fg_cnt reaches "4".

Next, when the count value fg_cnt reaches "4, the mode signal changes to MODE2" as well as the count value mode_reg is changed to "8". Therefore, the mode signal MODE2 indicative of the time period T2 is generated until the count value fg_cnt reaches "8".

Then, when the count value fg_cnt reaches "8", the mode signal MODE3 indicative of the time period T3 is generated. As such, the mode signal output circuit 52 is configured to divide the time period TA into the three time periods T1 to T3, and output the mode signals MODE1 to MODE3 corresponding to the time periods T1 to T3, respectively.

<<Details of PWM Signal Generating Circuit 53>>

The PWM signal generating circuit 53 includes a time period detecting circuit 60, a pulse number calculating circuit 61, an arithmetic circuit 62, and a signal generating circuit 63.

The time period detecting circuit 60 is configured to detect the period of the inputted PWM signal S1 and a time period of high-level in one period of the PWM signal S1. The time period detecting circuit 60 detects the period, etc., of the PWM signal S1, using a counter (not shown) that is configured to change the count value in synchronization with the clock signal CLK1 similarly to the FG counter 51, for example. Further, the time period detecting circuit 60 is configured to output the detected period of the PWM signal S1 as a count value wcnt, and output the detected high-level period in the one period of the PWM signal S1 as a count value hcnt.

The pulse number calculating circuit 61 is configured to calculate the number of pulses of the PWM signal S2 that the PWM signal generating circuit 53 can output in each of the time periods T1 and T3. The PWM signal S2 according to an embodiment of the present invention is generated in synchronization with the clock signal CLK2 used in counting the time period TA. Thus, the pulse number calculating circuit 61 calculates the number of pulses cslp_reg0 of the PWM signal S2 that can be outputted in the time period T1, by multiplying the count value fg_reg0 indicative of the number of pulses in the time period TA as a whole by the ratio of the time period T1. Further, the pulse number calculating circuit 61 calculates the number of pulses cslp_reg2 of the PWM signal S2 that can be outputted in the time period T3 by multiplying the count value fg_reg0 by the ratio of the time period T3. This number of pulses cslp_reg0 is equal to the amount of change in the count value fg_cnt in the time period T1 in the FG counter 51, and the number of pulses cslp_reg2 is equal to the amount of change in the count value fg_cnt in the time period T3.

The arithmetic circuit 62 is configured to calculate, in synchronization with the clock signal CLK2, the duty cycles D1 to D3 of the PWM signal S2 in the time periods T1 to T3, respectively.

Specifically, the arithmetic circuit 62 calculates the duty cycle D1 in the time period T1, based on the following equation (1), every time the count value fg_cnt changes.

$$D1 = (duty/cslp\_reg0) \times fg\_cont \quad (1)$$

where duty=hcnt/wcnt. As is apparent from the equation (1), as the time period T1 starts and the count value fg_cnt is incremented, the duty cycle D1 increases. In the equation (1), "cslp_reg0" is the amount of change in the count value fg_cnt until the time period T1 ends. Therefore, when the time period T1 ends, the duty cycle D1 results in D1=duty.

The arithmetic circuit 62 calculates the duty cycle D2 in the time period T2, based on an equation (2).

$$D2 = \text{duty} \quad (2)$$

Further, the arithmetic circuit 62 calculates the duty cycle D3 in the time period T3, based on the equation (3), every time the count value fg_cnt changes.

$$D3 = \text{duty} - (\text{duty}/cslp\_reg2) \times (fg\_cnt - CNT2) \quad (3)$$

where the count value CNT2 is the count value fg_cnt at which the time period T3 starts, and is (½)×fg_reg0, for example. Thus, as the count value fg_cnt is incremented, the duty cycle D3 decreases. Further, in the equation (3), "cslp_reg2" is the amount of change in the count value fg_cnt until the end of the time period T3. Therefore, when the count value fg_cnt becomes equal to fg_reg0, the duty cycle D3 results in D3=0.

Incidentally, the time period T3 is a time period calculated based on the FG signal inputted to the FG counter 51 in the past, and the count value fg_cnt is the count value of the FG signal being inputted to the FG counter 51 at present. Thus, for example, even after the time period T3 ends, the mode signal MODE3 may continue to be outputted and the count value fg_cnt may continue to be incremented. In such a case, since the count value fg_cnt continues to be incremented, the duty cycle D3 results in a negative value. Therefore, for example, when the result of the calculation of the duty cycle D3 is of a negative value, the arithmetic circuit 62 outputs "0" as the duty cycle D3.

That is, when the value of the equation (3) is negative, D3 is given as follows:

$$D3 = 0 \quad (4)$$

When executing the calculation of the equations (1) and (3), the arithmetic circuit 62 calculates the product of a value indicative of the duty cycle (hcnt/wcnt) and the count value fg_cnt before division processing, in order to improve calculation accuracy.

The signal generating circuit 63 is configured to generate the PWM signal S2 with the duty cycles D1 to D3 obtained by the arithmetic circuit 62 in synchronization with the clock signal CLK2.

a description will be given of an example of a waveform of the PWM signal S2 generated in the signal generating circuit 63 with reference to FIGS. 8 to 10.

Figure 8:
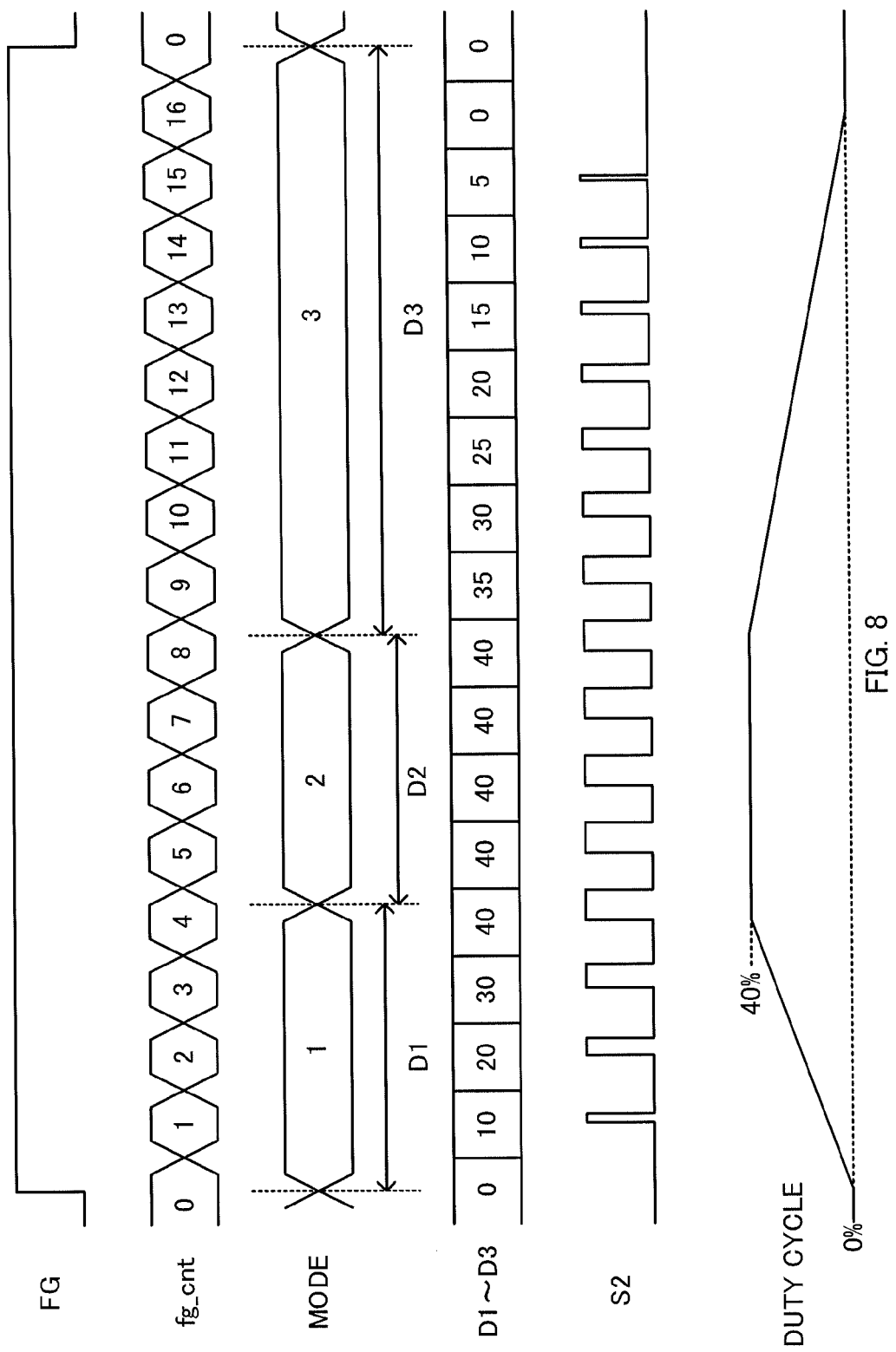
FIG. 8 is a diagram for describing an operation of a PWM signal generating circuit 53 when a time period during which a present FG signal is high is equal to a time period TA.

FIG. 8 depicts one example in the case where a time period (second time period) during which the FG signal being inputted to the FG counter 51 at present is high or low is equal to the time period TA (first time period, third time period, and fourth time period) detected in the past. FIG. 9 depicts one example in the case where a time period during which the FG signal being inputted to the FG counter 51 at present is high or low is shorter than the time period TA, and FIG. 10 depicts one example in the case where a time period during which the FG signal being inputted to the FG counter 51 at present is high or low is longer than the time period TA.

Here, in the same manner as in the case of FIG. 7, the count value fg_reg0 indicative of the time period TA is set at "16", for example, the count value CNT1 at which the time period T2 starts is set at "4" ((¼)×fg_reg0), and the count value CNT2 at which the time period T3 starts is set at "8" ((½)× fg_reg0). Thus, "cslp_reg0" results in "4" and "cslp_reg2" results in "8". Further, it is assumed that the duty is duty=hcnt/wcnt=40%.

Firstly, a description will be given, with reference to FIG. 8, of the case where a time period during which the present FG signal is high is equal to the time period TA, that is, the case where the count value fg_cnt in the time period during which the present FG signal is high is "16".

By assigning values to variables in the above described equation (1), the duty cycle D1 in the time period T1 is expressed by an equation (5).

$$D1 = (40/4) \times fg\_cont \quad (5)$$

Thus, until the count value fg_cnt changes from "0" to "4", the duty cycle D1 increases in a stepwise manner. When the count value fg_cnt is incremented to reach "4", the time period T2 is started. The duty cycle D2 in the time period T2 is maintained constant (40%) as is apparent from the equation (2).

When the count value fg_cnt is incremented to reach "8", the time period T3 is started. By assigning values to variables in the equation (3), the duty cycle D3 in the time period T3 is expressed by an equation (6).

$$D3 = 40 - (40/8) \times (fg\_cnt - 8) \quad (6)$$

Thus, until the count value fg_cnt changes from "9" to "16", the duty cycle D3 decreases in a stepwise manner. As such, the duty cycle of the PWM signal S2 increases in a gradual manner, is maintained constant, and thereafter decreases in a gradual manner.

Then, a description will be given, with reference to FIG. 9, of the case where a time period during which the present FG signal is high is shorter than the time period TA, that is, the case where the count value fg_cnt in the time period during which the present FG signal is high is "13" (<"fg_reg0=16"), for example. It is assumed here that the FG signal goes high at time t10 and that the FG signal goes low at time t11 after the count value fg_cnt reaches "13". Since the waveform in a time period from "0" to "13" of the count value fg_cnt (time period from time t10 to time t11) is similar to that in FIG. 8, a description thereof is omitted.

At time t11, when the FG signal goes low, that is, when the logic level of the FG signal changes, the count value fg_cnt is reset and the mode signal MODE1 is outputted. Thus, at time t11, the duty cycle changes from D3 to D1. Therefore, at time t11, the duty cycle changes again in the same manner as at time t10.

Further, a description will be given, with reference to FIG. 10, of the case where a time period during which the present FG signal is high is longer than the time period TA, that is, the case where the count value fg_cnt in the time period during which the present FG signal is high is "18" (>"fg_reg0=16"), for example. It is assumed that the FG signal goes high at time t20 and that the FG signal goes low at time t22 after the count value fg_cnt reaches "18". Since the waveform in a time period from "0" to "16" of the count value fg_cnt (time period from time t20 to time t21) is similar to that in FIG. 8, a description thereof is omitted.

After the count value fg_cnt reaches "16" at time t21, the count value fg_cnt is incremented to reach "17". The duty cycle D3 at the count value fg_cnt of "17" can be obtained by the equation (7) where "17" is assigned to the variable of equation (6).

$$D3 = 40 - (40/8) \times (17 - 8) \quad (7)$$
$$= -5 (< 0)$$

As a result, since the duty cycle D3 results in a negative value, "0" is outputted as the duty cycle D3, from the above described equation (4). Further, the same applies to the case where the count value fg_cnt is incremented to reach "18". When the FG signal goes low at time t22, since the count value fg_cnt is reset as well as the mode signal MODE1 is outputted, the operation at time t20 is repeated.

<<Details of H-Bridge Control Circuit 54>>

The H-bridge control circuit 54 generates the drive signals Vdr1 to Vdr4 based on the PWM signal S2 and the FG signal, to control the H-bridge circuit 25.

When the FG signal is high, the H-bridge control circuit 54 controls the H-bridge circuit 25 so that the drive current Idr flows from the terminal OUT1 to the terminal OUT2. Specifically, the H-bridge control circuit 54 turns on the NMOS transistor 43 and turns off the PMOS transistor 41 and NMOS transistor 42, as well as performs switching of the PMOS transistor 40 based on the PWM signal S2, for example.

On the other hand, when the FG signal is low, the H-bridge control circuit 54 controls the H-bridge circuit 25 so that the drive current Idr flows from the terminal OUT2 to the terminal OUT1. Specifically, the H-bridge control circuit 54 turns on the NMOS transistor 42 and turns off the PMOS transistor 40 and NMOS transistor 43, as well as performs switching of the PMOS transistor 41 based on the PWM signal S2, for example.

Figure 11:
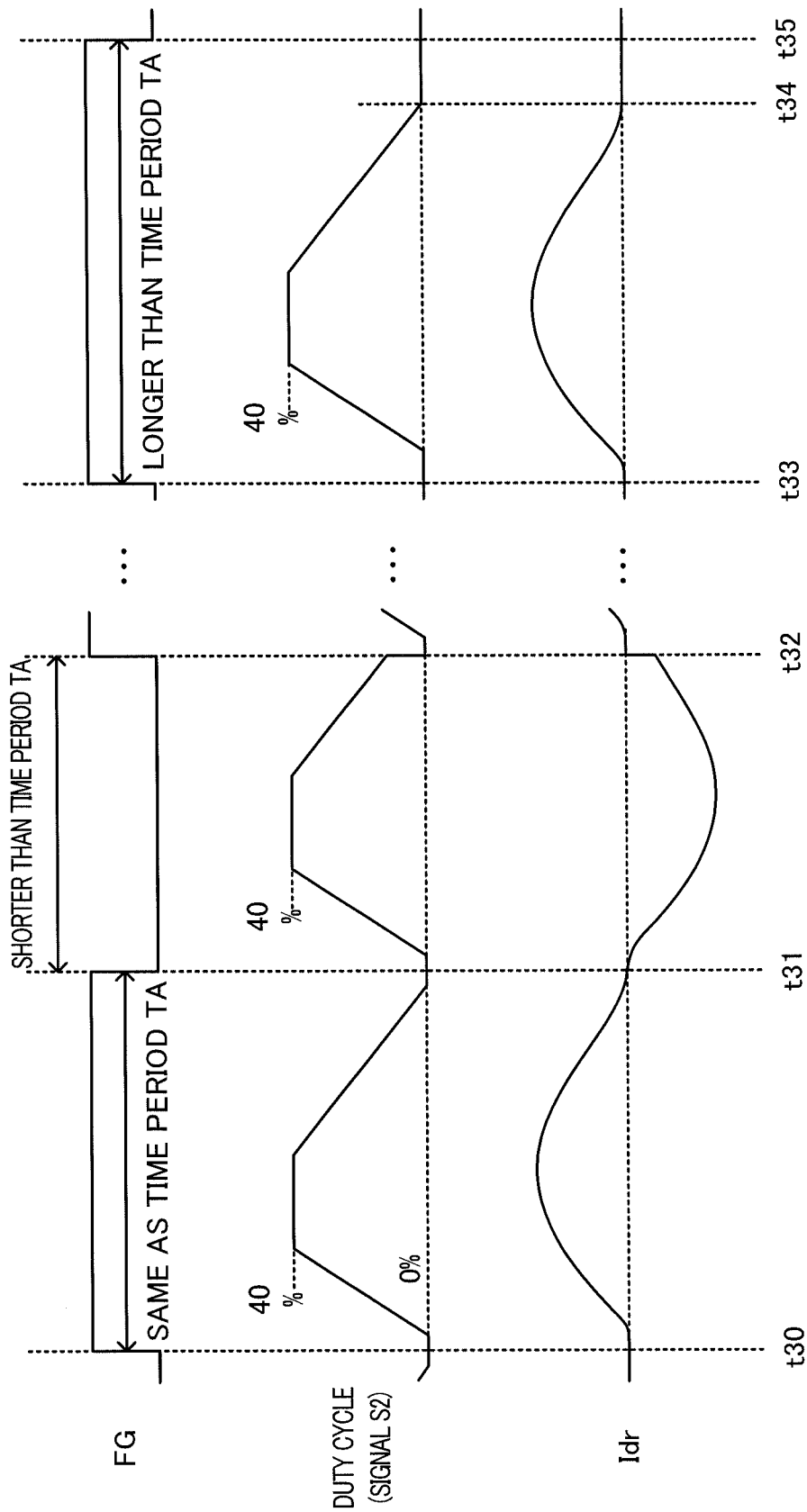
FIG. 11 is a diagram illustrating one example of a drive current Idr.

FIG. 11 depicts the change in the drive current Idr if the PWM signal S2 with the duty cycle changing from 0% to 40% is inputted to the H-bride control circuit 54. It is assumed here, for example, that the time period from time t30 to time t31 is equal to the time period TA, that the period from time t31 to time t32 is shorter than the time period TA, and that the time period from time t33 to time t35 is longer than the time period TA.

For example, in time t30 to time t31, as the duty cycle of the PWM signal S2 increases in a stepwise manner, the drive current Idr increases in a gradual manner, and when the duty cycle of the PWM signal S2 becomes constant, the change in the drive current Idr is suppressed. Then, as the duty cycle of the PWM signal S2 decreases in a stepwise manner, the drive current Idr decreases in a gradual manner. It is assumed here that the current flowing from the terminal OUT1 to the terminal OUT2 is a positive current. Thus, the drive current Idr flows to change in a gentle manner according to the duty cycle of the PWM signal S2.

Further, in time t31 to time t32, the FG signal is low, thereby flowing the drive current Idr in a negative direction similar to that flowing in the time period from time t30 to time t31. However, since this time period is shorter than the time period TA, the logic level of the FG signal changes thereby causing phase switching at time t32. Even in such a case, at time t32, the duty cycle of the PWM signal S2 increases again. Thus, after time t32 when the phase switching has occurred, the drive current Idr can be securely increased.

In time t33 to time t35, since the FG signal is high, the drive current Idr flows in a positive direction similar to that flowing in the time period from time t30 to time t31. Since this period is longer than the time period TA, the PWM signal S2 with the duty cycle of zero continues to be outputted from time t34 to time t35 at which the phase switching occurs. Thus, until when the phase switching occurs, the drive current Idr can be decreased to zero with reliability.

As such, in an embodiment of the present invention, it is possible to change the drive current Idr in a gentle manner as well as reliably increase the drive current Idr when the phase switching occurs, and thereafter decrease it.

Drive Signal Output Circuit 24b

Second Embodiment

Figure 12:
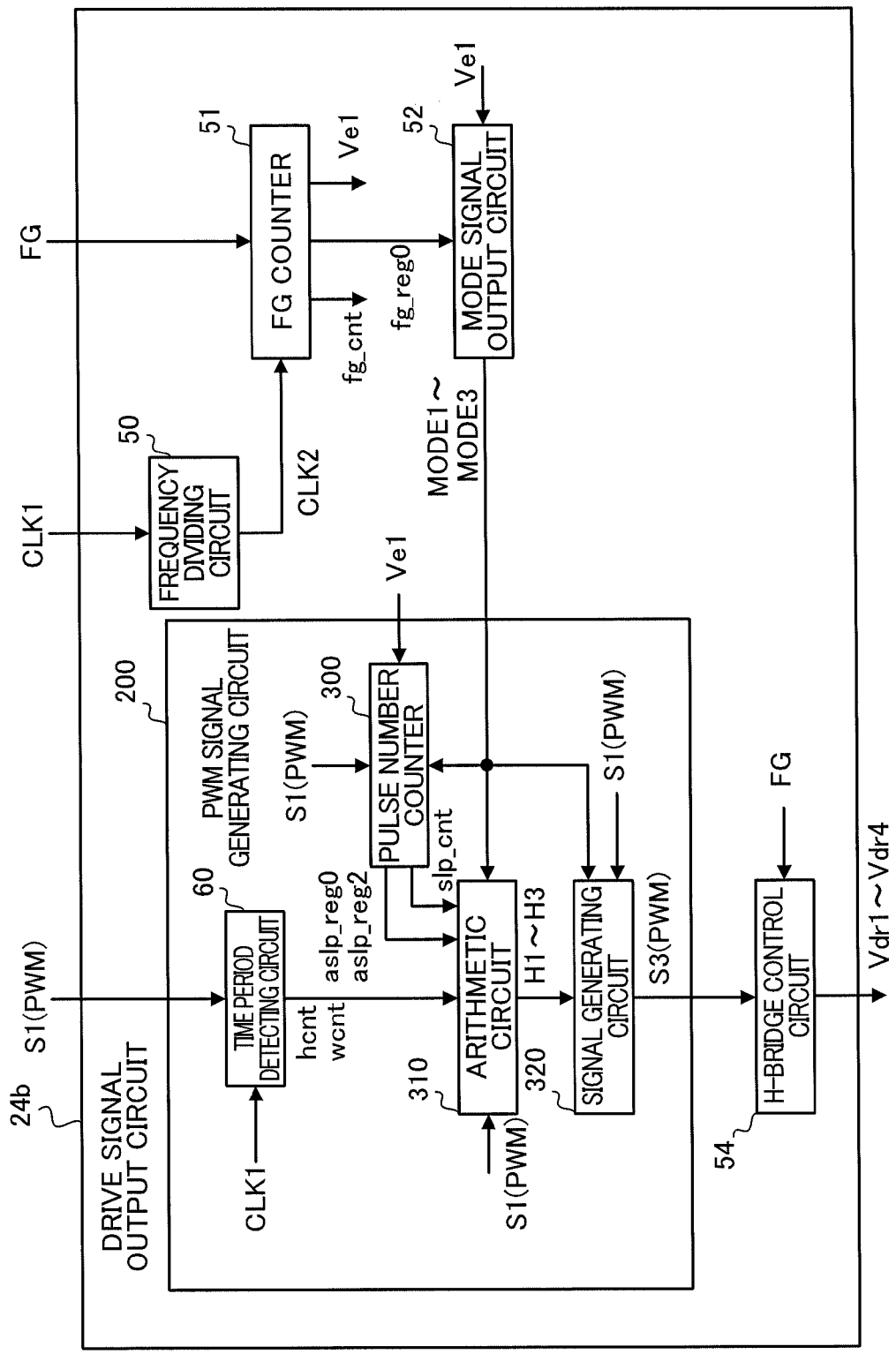
FIG. 12 is a diagram illustrating a configuration of a drive signal output circuit 24b.

FIG. 12 is a diagram illustrating a configuration of the drive signal output circuit 24 according to a second embodiment of the present invention. In FIG. 2 and FIG. 12, the blocks designated by the same reference numerals are equivalent.

A drive signal output circuit 24b (PWM signal output circuit) of FIG. 12 uses a PWM signal generating circuit 200 in place of the PWM signal generating circuit 53.

The PWM signal generating circuit 200 (first and second generating circuits) is a circuit configured to generate a PWM signal S3 that is in synchronization with the PWM signal S1 inputted thereto, and includes the time period detecting circuit 60, a pulse number counter 300, an arithmetic circuit 310, and a signal generating circuit 320. Since the time period detecting circuit 60 is a block equivalent to that illustrated in FIG. 2, a description thereof is omitted.

The pulse number counter 300 is configured to count the number of pulses of the PWM signal S1 inputted in each of the time periods T1 and T3. Then, the pulse number counter 300 outputs, to the arithmetic circuit 310, the number of pulses of the PWM signal S1 counted in the time period T1, as "aslp_reg0"; and the number of pulses of the PWM signal S1 counted in the time period T3, as "aslp_reg2". It should be noted that "aslp_reg0" is the amount of change in the count value slp_cnt of the pulse number counter 300 in the time period T1, and "aslp_reg2" is the amount of change in the count value slp_cnt of the pulse number counter 300 in the time period T3.

The pulse number counter 300 is reset when the edge pulse Ve1 is inputted thereto, and is set at "1" as the count value slp_cnt when the mode signal MODE3 is inputted thereto, for example.

The arithmetic circuit 310 is configured to calculate, in synchronization with the PWM signal S1, high-level periods H1 to H3 in one period of the PWM signal S3 in the time periods T1 to T3, respectively.

Specifically, the arithmetic circuit 310 calculates the high-level period H1 in the time period T1, based on the following equation (8), every time the count value slp_cnt changes.

$$H1=(hcnt/aslp\_reg0)\times slp\_cnt \quad (8)$$

As is apparent from the equation (8), as the time period T1 starts and the count value slp_cnt is incremented, the high-level period H1 increases. In the equation (8), "aslp_reg0" is the amount of change in the count value slp_cnt during a time period until when the time period T1 ends. Thus, when the time period T1 ends, the high-level period H1 results in H1=hcnt.

Further, the arithmetic circuit 310 calculates the high-level period H2 in the time period T2, based on an equation (9).

$$H2=hcnt \quad (9)$$

Furthermore, the arithmetic circuit 310 calculates the high-level period H3 in the time period T3, based on an equation (10), every time the count value slp_cnt changes.

$$H3=hcnt-(hcnt/aslp\_reg2)\times(slp\_cnt) \quad (10)$$

Thus, when the count value slp_cnt is incremented, the high-level period H3 is lowered. Further, in the equation (10), "aslp_reg2" is the amount of change in the count value slp_cnt during a time period until when the time period T3 ends. Thus, when the count value slp_cnt becomes equal to aslp_reg2 at the time when the time period T3 ends, the high-level period H3 results in H3=0.

Similarly to the circuit in FIG. 2, however, the mode signal MODE3 may continue to be outputted and the count value slp_cnt may continue to be incremented. In such a case, since the count value slp_cnt continues to be incremented, the high-level period H3 results in a negative value. Thus, for example, when the result of the calculation of the high-level period H3 is a negative value, the arithmetic circuit 62 outputs "0" as the high-level period H3.

That is, if the value of equation (10) is negative, H3 is expressed as follows:

$$H3=0 \quad (11).$$

When executing the calculation of the equations (8) and (10), the arithmetic circuit 310 calculates the product of the value hcnt indicative of the high-level period and the count value slp_cnt before division processing is performed, in order to improve calculation accuracy.

The signal generating circuit 320 is configured to generate, in synchronization with the PWM signal S1, the PWM signal S3 with the high-level periods H1 to H3 calculated in the time periods T1 to T3, respectively.

Figure 13:
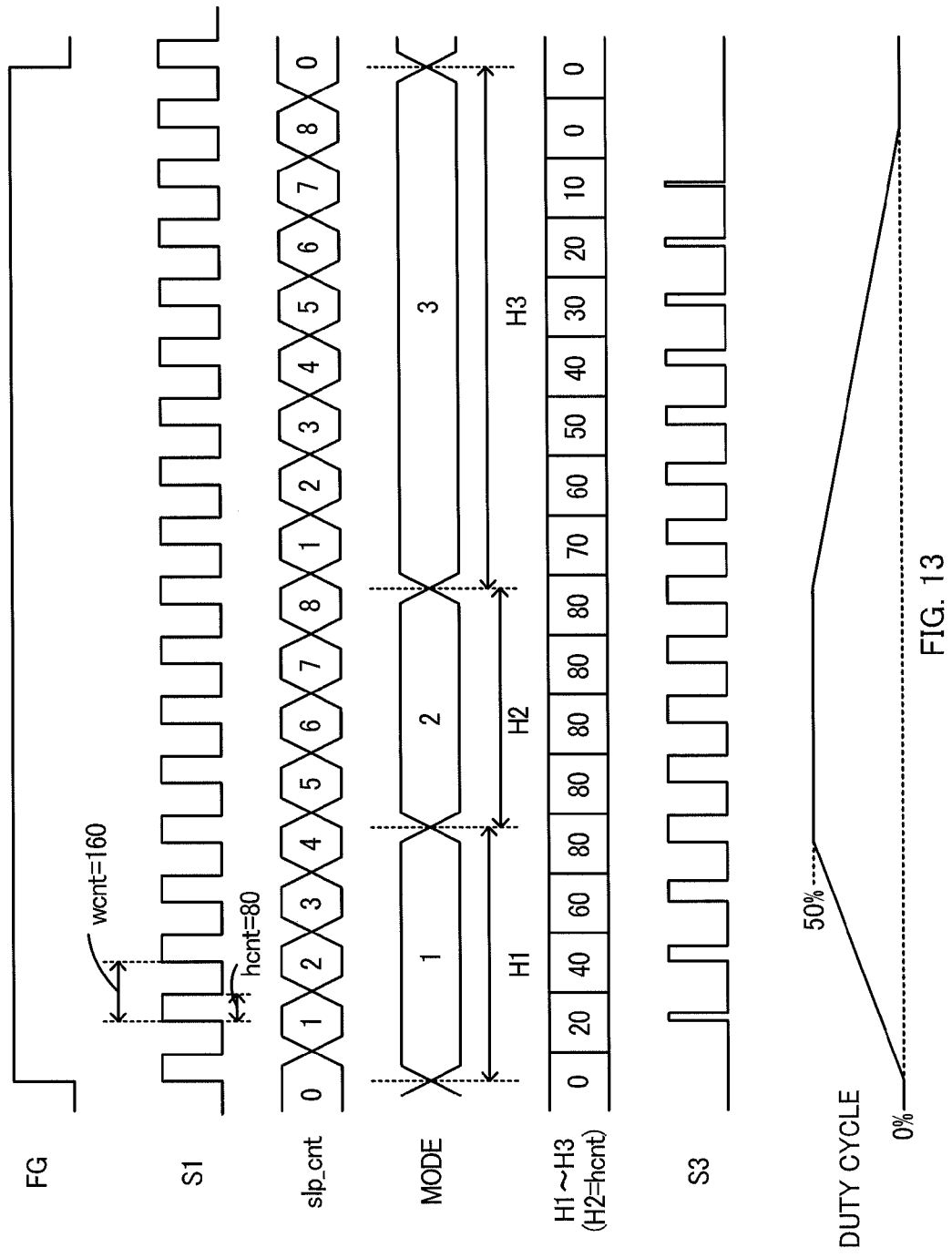
FIG. 13 is a diagram for describing an operation of a PWM signal generating circuit 200.

Here, a description will be given of one example of the waveform of the PWM signal S3 generated in the signal generating circuit 320 with reference to FIG. 13. It is assumed here that the number of pulses "aslp_reg0" of the PWM signal S1 in the time period T1 is "4", and the number of pulses "aslp_reg2" of the PWM signal S1 in the time period T3 is "8". It is also assumed that the count value "hcnt" indicative of the high-level period of the PWM signal S1 is "80" and that the count value "wcnt" indicative of the time period of one period of the PWM signal S1 is "160". That is, the duty cycle of the PWM signal S1 is 50%.

It is further assumed that the time period during which the FG signal is actually high is equal to the time period TA.

Firstly, by assigning values to variables in the equation (8), the high-level period H1 in the time period T1 is expressed by an equation (12).

$$H1=(80/4) \times slp\_cnt \quad (12)$$

Thus, until the count value slp_cnt changes from "0" to "4", the high-level period H1 increases in a stepwise manner. The high-level period H2 in the time period T2 is maintained constant at "80" as is apparent from the equation (9).

Then, when the time period T3 starts, by assigning values to variables of the equation (10), the high-level period H3 in the time period T3 is expressed by an equation (13).

$$H3=80-((80/8) \times slp\_cnt) \quad (13)$$

Thus, until the count value slp_cnt changes from "1" to "8", the high-level period H3 decreases in a stepwise manner. Since the PWM signal S3 and the PWM signal S1 are of the same period, as the high-level period of H1 to H3 changes, the duty cycle of the PWM signal S3 changes in the same manner. As a result, the duty cycle of the PWM signal S3 increases in a gradual manner, is maintained constant (50%), and thereafter decreases in a gradual manner.

Figure 9:
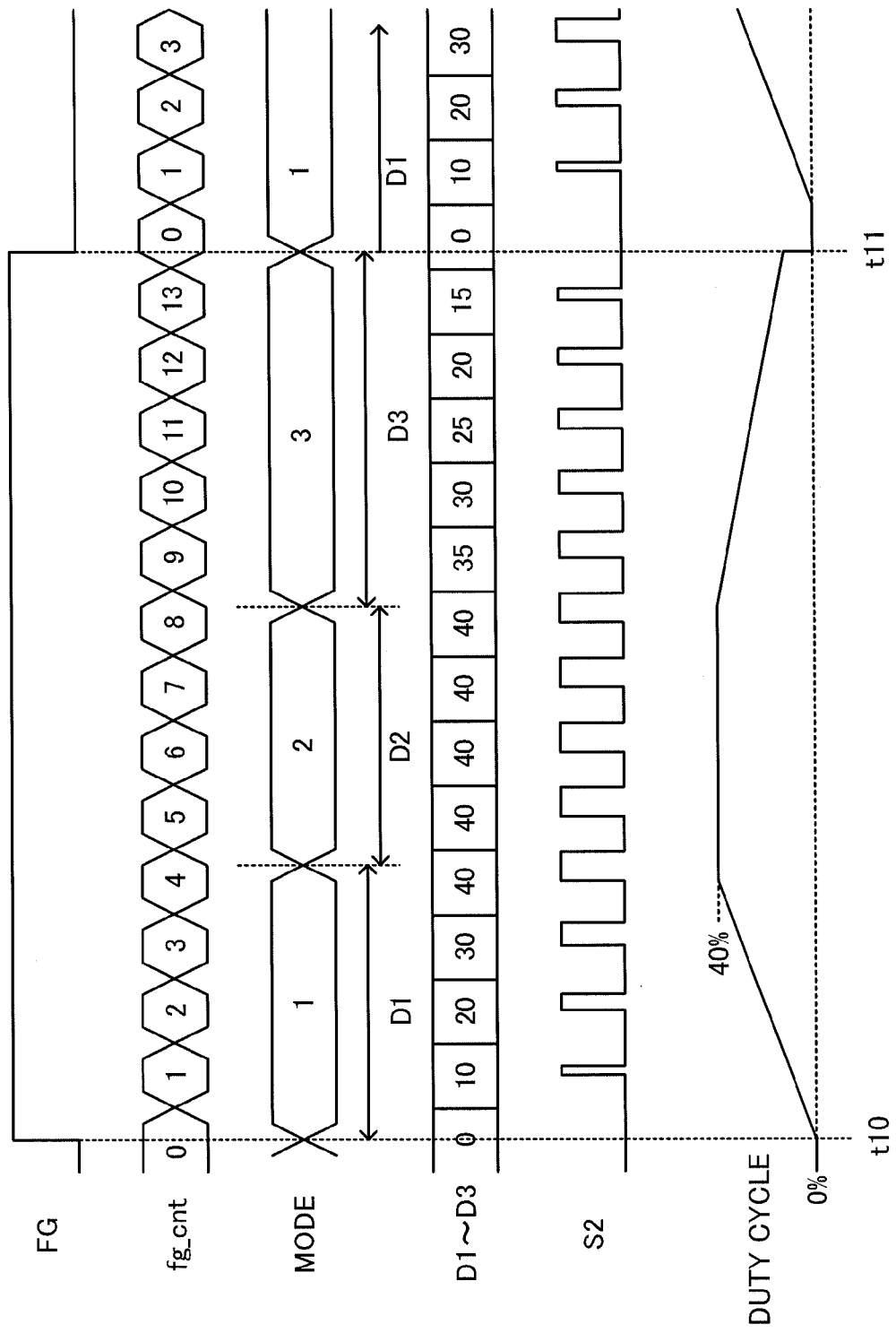
FIG. 9 is a diagram for describing an operation of a PWM signal generating circuit 53 when a time period during which a present FG signal is high is shorter than a time period TA.
Figure 10:
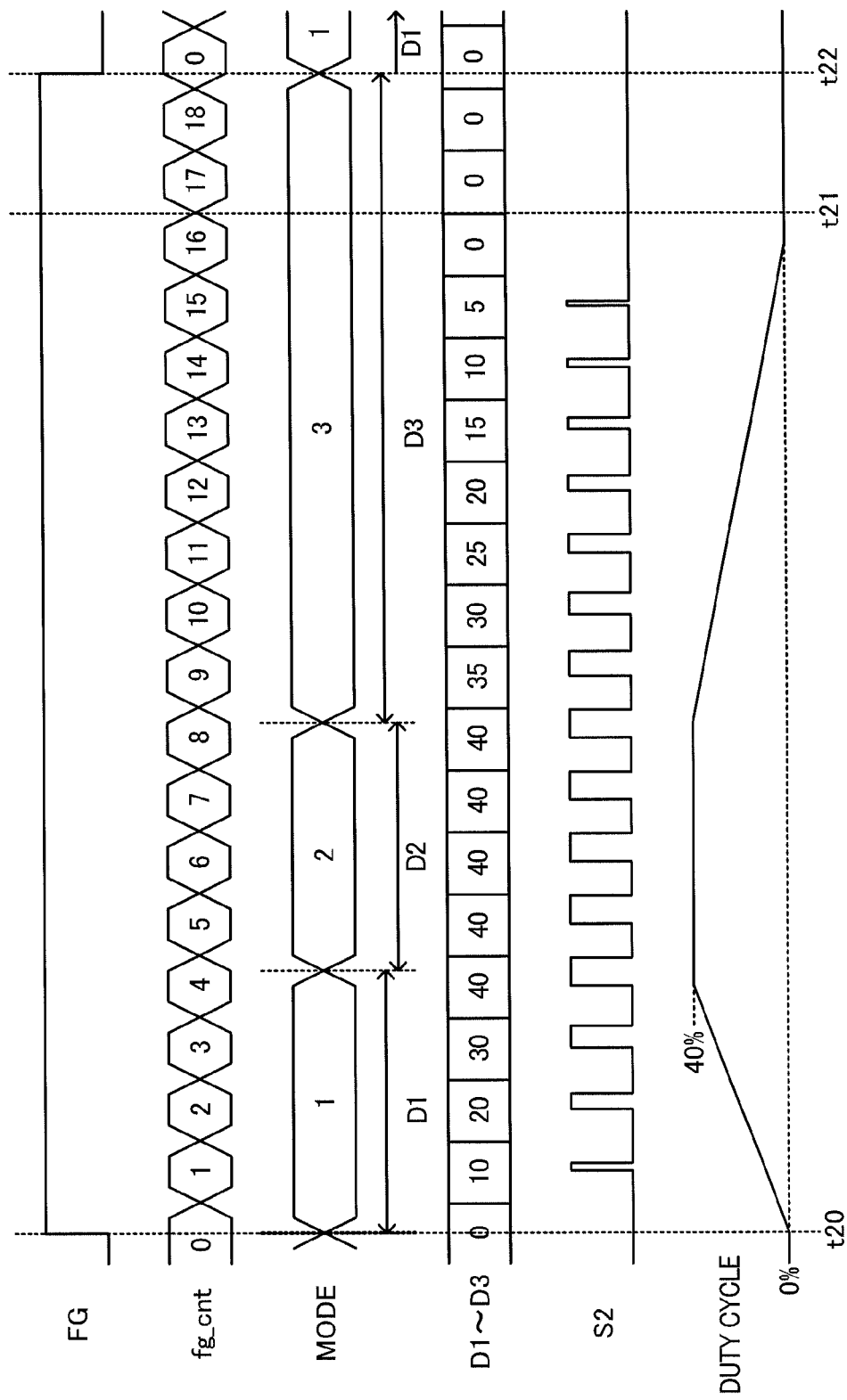
FIG. 10 is a diagram for describing an operation of a PWM signal generating circuit 53 when a time period during which a present FG signal is high is longer than time period TA.

For example, when the time period during which the FG signal is actually high is shorter than the time period TA, the waveform of the PWM signal becomes similar to FIG. 9, and when the time period during which the FG signal is actually high is longer than the time period TA, the waveform of the PWM signal becomes similar to FIG. 10, and therefore, detailed descriptions thereof are omitted. Thus, in the case of using the drive signal output circuit 24b depicted in FIG. 12, the drive current Idr changes in the same manner as in the case of using the drive signal output circuit 24a depicted in FIG. 2.

Drive Signal Output Circuit 24c

Third Embodiment

Figure 14:
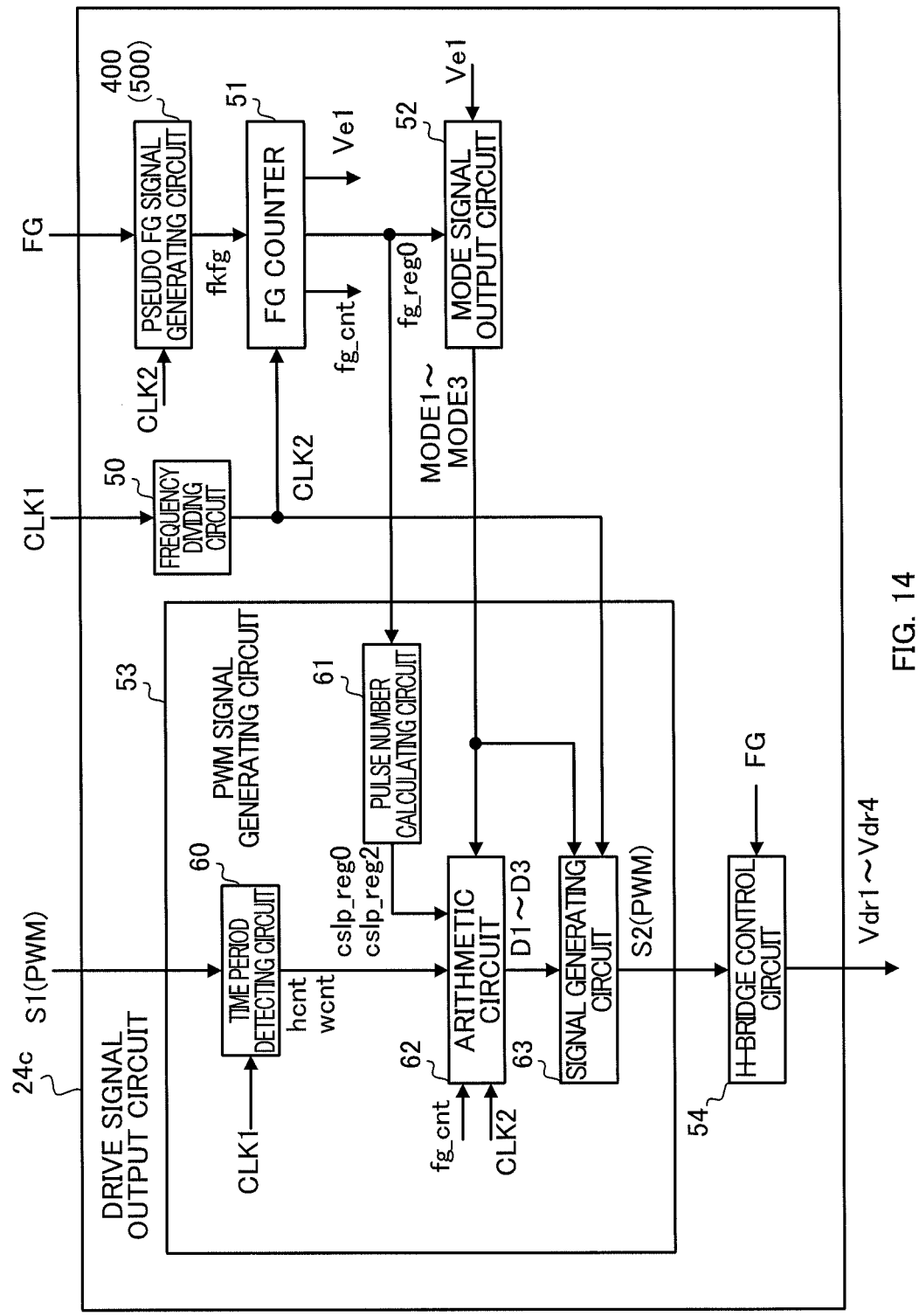
FIG. 14 is a diagram illustrating a configuration of a drive signal output circuit 24c.

FIG. 14 is a diagram illustrating a configuration of the drive signal output circuit 24 according to a third embodiment of the present invention. In FIG. 2 and FIG. 14, the blocks designated by the same reference numerals are equivalent. In a drive signal output circuit 24c of FIG. 14, a pseudo FG signal generating circuit 400 is added to the drive signal output circuit 24a.

<<Pseudo FG Signal Generating Circuit According to First Embodiment>>

Figure 15:
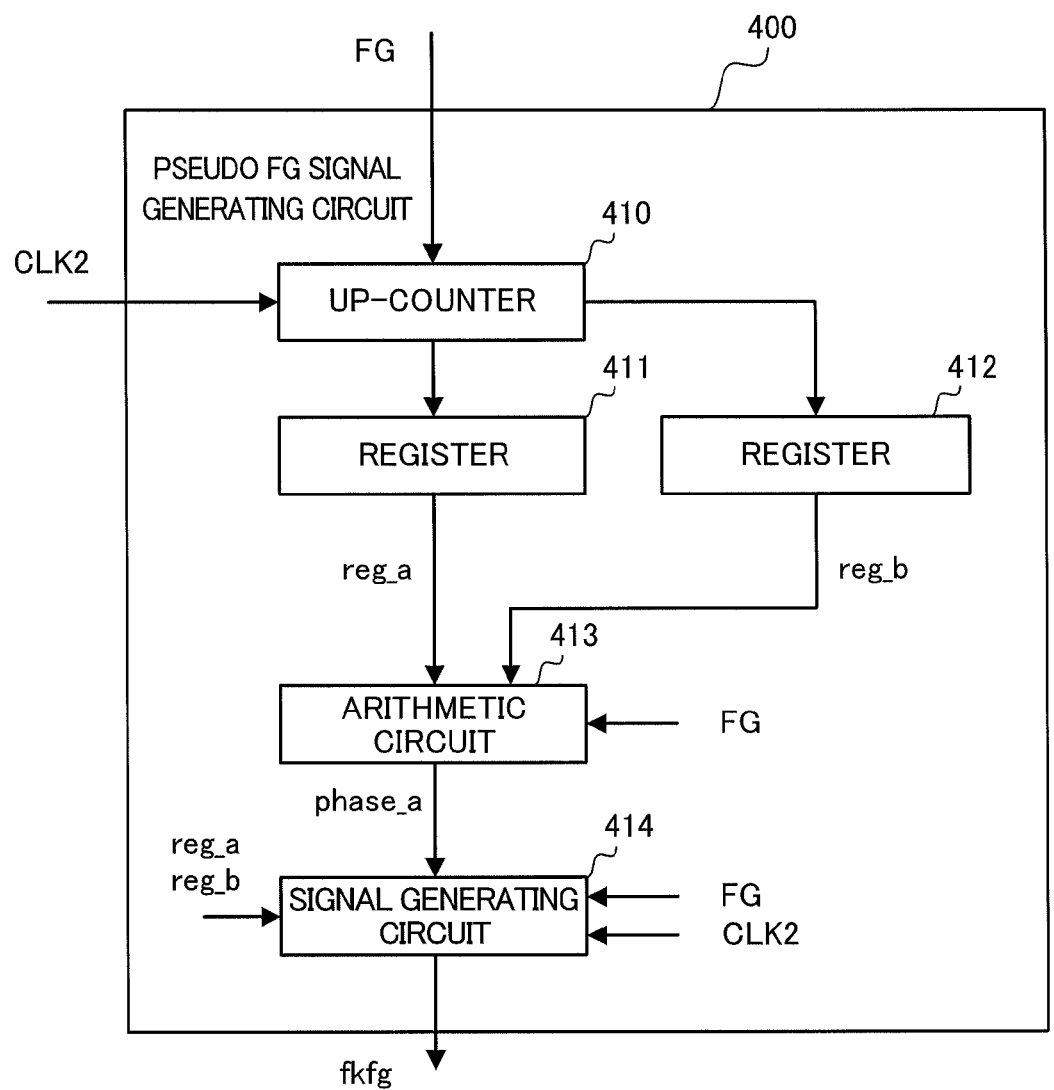
FIG. 15 is a diagram illustrating one example of a pseudo FG signal generating circuit 400.

The pseudo FG signal generating circuit 400 (correcting unit) is a circuit configured to correct the inputted FG signal so that the high-level period and the low-level period of the FG signal become equal, and output the corrected signal as a signal fkfg. The pseudo FG signal generating circuit 400 includes an up-counter 410, registers 411 and 412, an arithmetic circuit 413, and a signal generating circuit 414, as illustrated in FIG. 15.

The up-counter 410 is configured to count to measure the time period during which the FG signal is high and the time period during which the FG signal is low. The up-counter 410 is further configured to store in the register 411 the count value in the time period during which the FG signal is low and store in the register 412 the count value in the time period during which the FG signal is high.

The register 411 is configured to store the time period during which the FG signal is low as a count value reg_a (first count value), and the register 412 is configured to store the time period during which the FG signal is high as a count value reg_b (second count value).

For example, when the FG signal changes from high to low and the count value reg_b stored in the register 412 is updated, the arithmetic circuit 413 (calculating unit) calculates a value phase_a equal to a half of a difference del_fg (=reg_a−reg_b) between the count value reg_a and the count value reg_b.

For example, when the FG signal changes from low to high, the signal generating circuit 414 (signal output unit) outputs the high-level signal fkfg, in synchronization with the clock signal CLK2, during a time period based on the count value reg_b and the value phase_a. Specifically, when the difference del_fg is negative, that is, when the count value reg_a is smaller than the count value reg_b, the high-level signal fkfg is outputted during the time period corresponding to the value obtained by subtracting the value phase_a from the count value reg_b. On the other hand, when the difference del_fg is positive, that is, when the count value reg_a is greater than the count value reg_b, the high-level signal fkfg is outputted during the time period corresponding to the value obtained by adding the value phase_a to the count value reg_b.

After outputting the high-level signal fkfg, the signal generating circuit 414 outputs the low-level signal fkfg in synchronization with the clock signal CLK2, during a time period based on the count value reg_a and the value phase_a. Specifically, when the count value reg_a is smaller than the count value reg_b, the low-level signal fkfg is outputted during the time period equivalent to the value obtained by adding the value phase_a to the count value reg_a. Whereas, when the count value reg_a is greater than the count value reg_b, the low-level signal fkfg is outputted during the time period corresponding to the value obtained by subtracting the value phase_a from the count value reg_a. As a result, every time the FG signal goes high, the signal fkfg that goes high and thereafter goes low is outputted.

Figure 16:
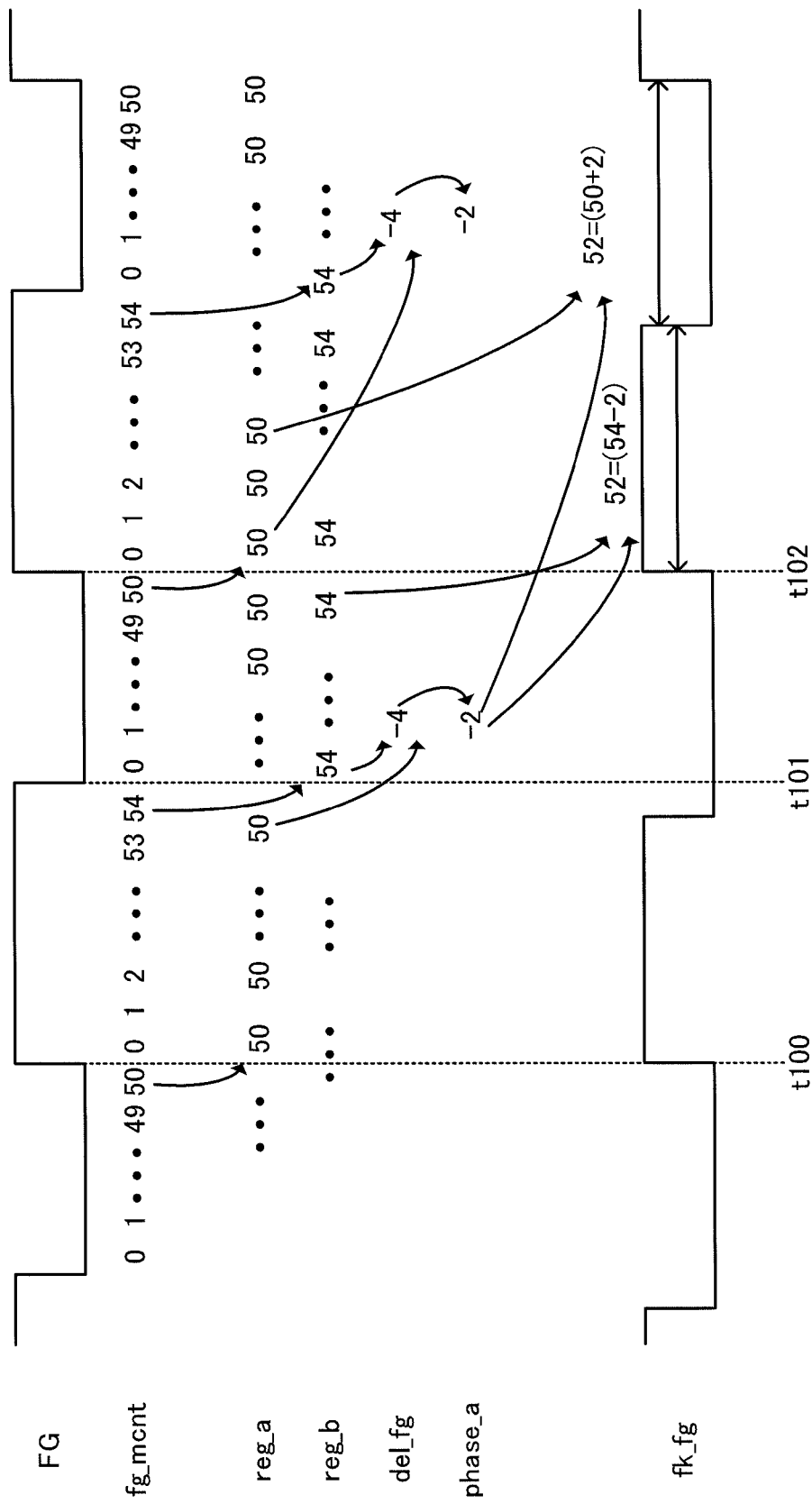
FIG. 16 is a diagram for describing an operation of a pseudo FG signal generating circuit 400.

FIG. 16 is a diagram for describing the signal fkfg generated by the pseudo FG signal generating circuit 400. For example, after time t100, the count value reg_a indicative of the time period during which the FG signal is low is updated, and the count value reg_a reaches "50". After time t101, the count value reg_b indicative of the time period during which the FG signal is high is updated, and the count value reg_b reaches "54". Further, when the FG signal changes from high to low at time t101 and the count value reg_b is updated, the different del_fg ("−4") and the value phase_a ("−2") are calculated. At time t102, when the FG signal changes from low to high, the H-level signal fkfg is outputted during the time period corresponding to the count value "52(=54−2)", and thereafter, the low signal fkfg is outputted during the time period corresponding to the count value "52(=50+2)". As such, the pseudo FG signal generating circuit 400 is configured to output the signal fkfg in which the high-level period and the low-level period are equal, every time the FG signal goes high.

The PWM signal generating circuit 53 in the drive signal output circuit 24c depicted in FIG. 14 is configured to generate the PWM signal S2 based on the signal fkfg in which the high-level period and the low-level period are equal. As a result, the time period during which the drive current Idr of the motor coil L flows in the positive direction becomes equal to the time period during which the drive current Idr of the motor coil L flows in the negative direction.

<<Pseudo FG Signal Generating Circuit According to Second Embodiment>>

Figure 17:
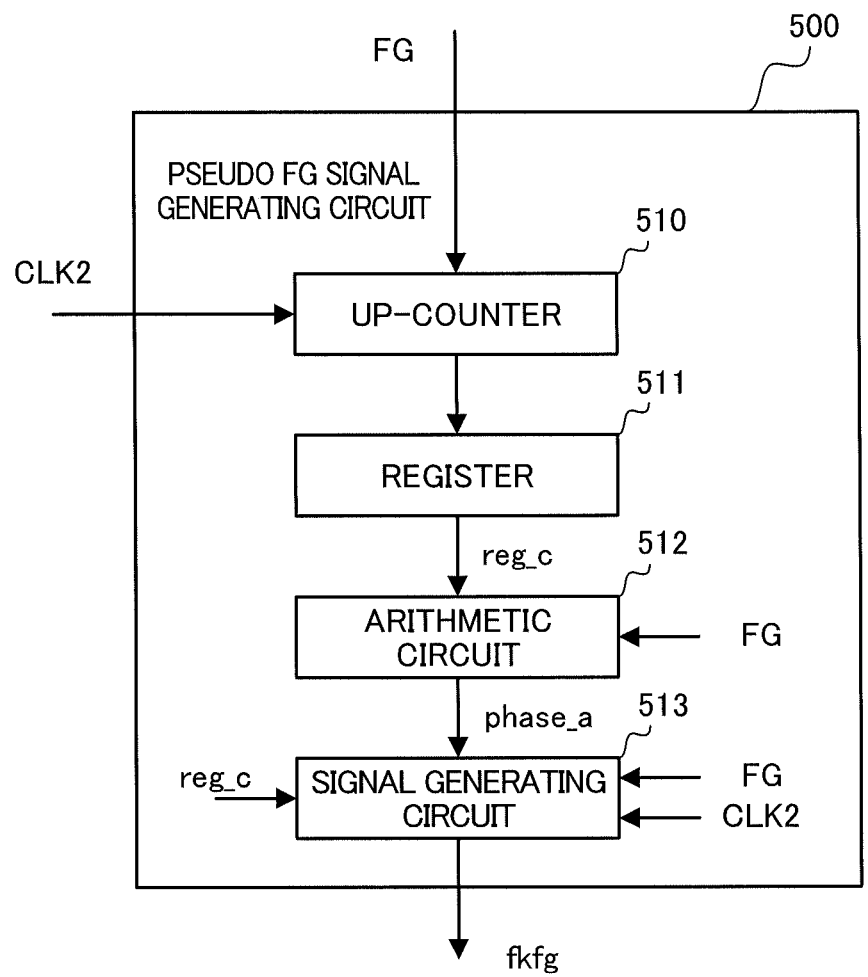
FIG. 17 is a diagram illustrating one example of a pseudo FG signal generating circuit 500.

A pseudo FG signal generating circuit 500 depicted in FIG. 17 is a circuit configured to output the signal fkfg obtained by correcting the FG signal, similarly to the pseudo FG signal generating circuit 400.

The pseudo FG signal generating circuit 500 (correcting unit) includes an up-counter 510, a register 511, an arithmetic circuit 512, and a signal generating circuit 513.

The up-counter 510 is configured to store the time period during which the FG signal is high in the register 511 when the FG signal changes from high to low, and stores the time period during which the FG signal is low in the register 511 when the FG signal changes from low to high.

The register 511 stores, as a count value reg_c, each of the time period during which the FG signal is high and the time period during which the FG signal is low.

The arithmetic circuit 512 (calculating unit) acquires, for example, the count value reg_c before being updated (count value indicative of the high-level period of the FG signal in the previous period) and the count value reg_c after being updated (count value indicative of the low-level period of the FG signal in the previous period) when the FG signal goes high, for example. The arithmetic circuit 512 then calculates the value phase_a that is one half of the difference del_fg between the count values reg_c before and after being updated (count value before being updated−count value after being updated).

For example, when the FG signal changes from high to low, the signal generating circuit 513 (signal output unit) outputs the L-level signal fkfg, in synchronization with the clock signal CLK2, during the time period based on the count value reg_c before being updated when the FG signal goes low (count value indicative of the low-level period of the FG signal in the previous period) and the value phase_a.

Specifically, when the difference del_fg is positive, the low-level signal fkfg is outputted during the time period corresponding to the value obtained by adding the value phase_a to the count value reg_c before being updated when the FG signal goes low. Whereas, when the difference del_fg is negative, the low-level signal fkfg is outputted during the time period corresponding to the value obtained by subtracting the value phase_a from the count value reg_c before being updated when the FG signal goes low.

After outputting the low-level signal fkfg, the signal generating circuit 513 outputs the high-level signal fkfg, in synchronization with the clock signal CLK2, during the time period based on the count value reg_c after being updated when the FG signal goes low (count value indicative of the high-level period of the FG signal in the previous period) and the value phase_a. Specifically, when the difference del_fg is positive, the high-level signal fkfg is outputted during the time period corresponding to the value obtained by subtracting the value phase_a from the count value reg_c after being updated when the FG signal goes low. Whereas, when the difference del_fg is negative, the high-level signal fkfg is outputted during the time period corresponding to the value obtained by adding the value phase_a to the count value reg_c after being updated when the FG signal goes low.

Figure 18:
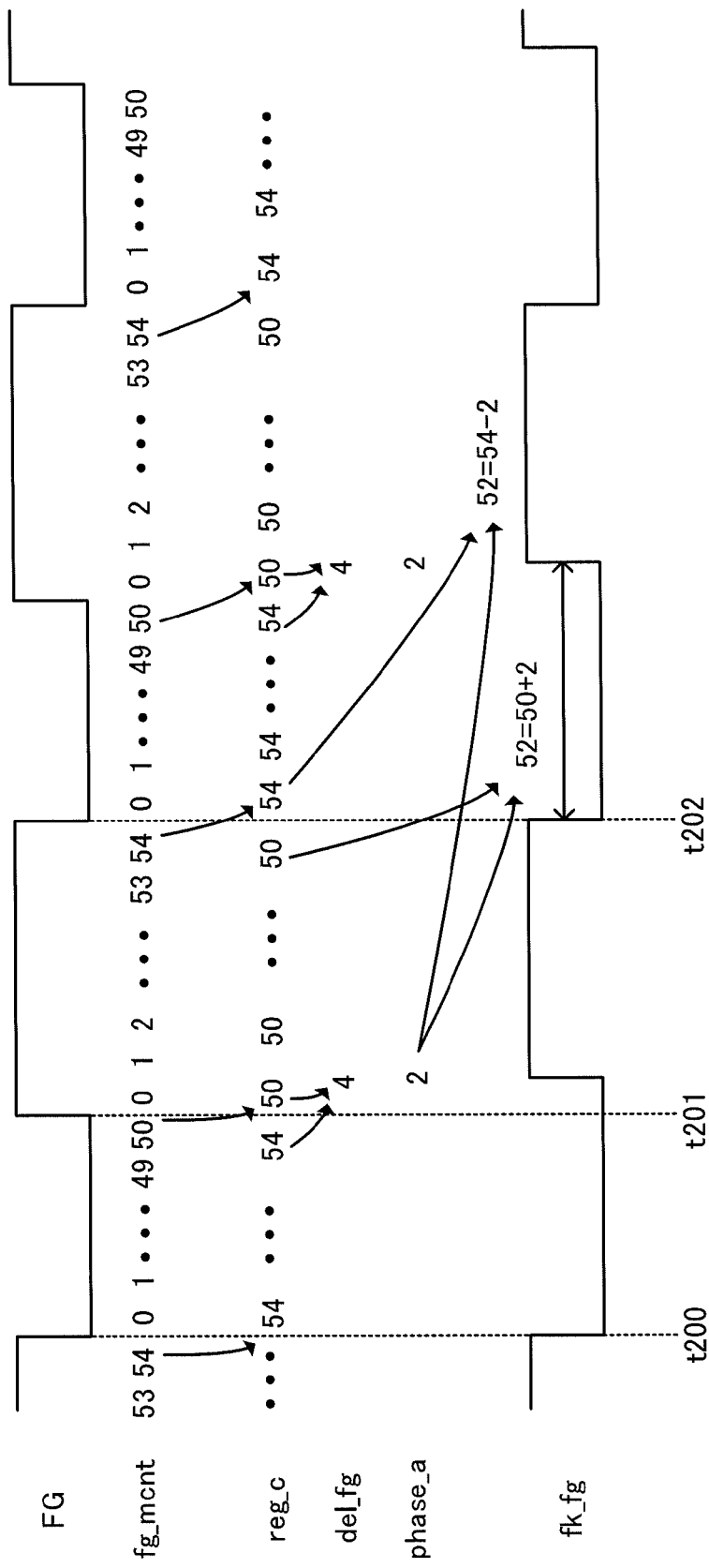
FIG. 18 is a diagram for describing an operation of a pseudo FG signal generating circuit 500.

FIG. 18 is a diagram for describing the signal fkfg generated in the pseudo FG signal generating circuit 500. For example, after time t200, the count value reg_c indicative of the time period during which the FG signal is high is updated and the count value reg_c reaches "54".

After time t201, the count value indicative of the time period during which the FG signal is low is updated and the count value reg_c reaches "50". When the FG signal changes from low to high at time t201, the difference del_fg ("4") and the value phase_a ("2") are calculated. Then, at time t202, when the FG signal changes from high to low, the low-level signal fkfg is outputted during the time period corresponding to the count value "52(=50+2)" and thereafter, the high-level signal fkfg is outputted during the time period corresponding to the count value "52(=54−2)". As such, the pseudo FG signal generating circuit 500 outputs the signal fkfg in which the low-level period and the high-level period are equal, every time the FG signal goes low. Thus, for example, even when the pseudo FG signal generating circuit 500 is used in place of the pseudo FG signal generating circuit 400 in the drive signal output circuit 24c depicted in FIG. 14, the effect similar to that in the case of using the pseudo FG signal generating circuit 400 can be obtained.

Hereinabove, the motor drive IC 10 according to an embodiment of the present invention has been described. For example, the drive signal output circuit 24a always generates the PWM signal S2 whose duty cycle increases and thereafter decreases in the time period from the change in the logic level of the FG signal to the subsequent change in the logic level of the FG signal. Thus, the drive signal output circuit 24a can rotate the motor 11 in a stable manner while causing the motor drive IC 10 to perform soft switching.

Even when the rotation speed of the motor 11 is constant, the time period during which the FG signal is high and the period during which the FG signal is low do not exactly match in general. However, as exemplified in FIG. 16, for example, each of the time period during which the FG signal is high and the time period during which the FG signal is low is almost constant. The drive signal output circuit 24a generates the PWM signal S2 in the time period during which the FG signal is high, based on the high-level period of the FG signal in the past, and generates the PWM signal S2 in the time period during which the FG signal is low, based on the low-level period of the FG signal in the past. Thus, the motor 11 can be rotated in a more stable manner.

When the PWM signal S2 is generated based on the signal fk_fg, consequently, the time period during which the drive current Idr of the motor coil flows in the positive direction becomes almost equal to the time period during which the drive current Idr of the motor coil flows in the negative direction. Thus, the motor 11 can be rotated in a more stable manner.

Since the signal fk_fg is generated by the up-counter 410, etc., the high-level period of the signal fk_fg and the low-level period of the signal fk_fg can be caused to match with accuracy.

When the time period during which the PWM signal S2 is generated at present becomes longer than the time period TA detected in the past, the PWM signal S2 whose duty cycle is "0" (predetermined duty cycle) is outputted. Thus, the drive current Idr is reliably brought to zero before the occurrence of the phase switching.

For example, even though the pseudo FG signal generating circuit 400 is used in the drive signal output circuit 24b, the effect similar to that in the drive signal output circuit 24c can be obtained.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A PWM signal output circuit configured to output a PWM signal to a drive circuit configured to drive a motor based on the PWM signal, the PWM signal output circuit comprising:
   a detecting circuit configured to detect a first speed time period during which a speed signal is at one logic level and a second speed time period during which the speed signal is at another logic level, based on the speed signal whose logic level changes in an alternate manner, the speed signal having a period corresponding to a rotation speed of the motor;
   a first generating circuit configured to, in response to the logic level of the speed signal changing, generate the PWM signal to increase and thereafter decrease current flowing through a motor coil of the motor within a first PWM time period wherein the PWM signal is generated according to a duration of the first speed time period which is detected by the detecting circuit in the second speed time period during which the speed signal is at the another logic level, the second speed time period and the first PWM time period occurring after the first speed time period; and
   a second generating circuit configured to, in response to the first PWM time period elapsing after the change in the logic level of the speed signal but before a subsequent change in the logic level of the speed signal in the second speed time period, generate the PWM signal with a predetermined duty cycle from substantially when the first PWM time period has elapsed until substantially the subsequent change in the logic level of the speed signal.

2. The PWM signal output circuit of claim 1, wherein the second generating circuit is further configured to, when the first PWM time period has not elapsed before the subsequent change in the logic level of the speed signal, generate, after the subsequent change in the logic level of the speed signal, the PWM signal to increase and thereafter decrease the current flowing through the motor coil within a second PWM time period wherein the PWM signal is generated according to a duration of the second speed time period which is detected in a third speed time period wherein the third speed time period and the second PWM time period are immediately subsequent to the second speed time period.

3. The PWM signal output circuit of claim 1, further comprising:
   a correcting circuit configured to form a corrected speed signal so that a first corrected time period during which the corrected speed signal is at the one logic level becomes equal to a second corrected time period during which the corrected speed signal is at the other logic level, the corrected speed signal having a period that is substantially equal to the period of the speed signal, wherein
   the detecting circuit is further configured to detect the first corrected time period during which the corrected speed signal is at the one logic level, and the second corrected time period during which the corrected speed signal is at the other logic level.

4. The PWM signal output circuit of claim 3, wherein the correcting circuit includes:
   a counter configured to count to measure the first speed time period during which the speed signal is at the one logic level, and the second speed time period during which the speed signal is at the other logic level;
   a calculating circuit configured to calculate a value of one half of a difference between a first count value corresponding to the first speed time period during which the speed signal is at the one logic level and a second count value corresponding to the second speed time period during which the speed signal is at the other logic level; and
   a signal output circuit configured to, when the speed signal changes to the one logic level, output a signal of the one logic level during a first output time period determined by the first count value and the value of the one half thereof, as the corrected speed signal, and thereafter output a signal of the other logic level during a second output time period determined by the second count value and the value of the one half thereof, as the corrected speed signal.

5. The PWM signal output circuit of claim 4 wherein the first corrected time period is derived from the first speed time period and wherein the second corrected time period is derived from the second speed time period.

6. The PWM signal output circuit of claim 1, wherein the second generating circuit is further configured to generate the PWM signal such that the duty cycle controls the current flowing through the motor coil to reach zero from substantially when the first PWM time period has elapsed until substantially the subsequent change in the logic level of the speed signal.

7. A method of forming a PWM signal output circuit comprising:
   configuring a first circuit to receive a speed signal having a period corresponding to a rotation speed of a motor, the speed signal having first period portion wherein the speed signal has a first logic level and a second period portion wherein the speed signal has a second logic level that is opposite to the first logic level; and
   configuring the PWM signal output circuit to form a PWM signal having a first PWM time interval and a varying value to control a current flow through a motor during the first PWM time interval wherein the first PWM time interval is generated according to a duration of the first period portion of the speed signal and is formed responsively to a first change in the logic level of the speed signal wherein the first change in the logic level occurs subsequently to the first period portion of the speed signal and the first PWM time interval is formed subsequently to the first period portion of the speed signal.

8. The method of claim 7 further including configuring the PWM signal output circuit to form the PWM signal to have a substantially constant value after the first PWM time interval and prior to a subsequent change in the value of the speed signal.

9. The method of claim 7 further including configuring the PWM signal output circuit to terminate the first PWM time interval responsively to the subsequent change in the logic level of the speed signal in response to the first PWM time interval not expiring prior to the subsequent change in the value of the speed signal; and configuring the PWM signal output circuit to form the PWM signal having a second PWM time interval and another varying value responsively to the subsequent change in the value of the speed signal wherein the second PWM time interval is generated according to a duration of the second period portion of the speed signal and is formed subsequently to the second period portion of the speed signal.

* * * * *